US010859690B2

(12) United States Patent
Takahashi et al.

(10) Patent No.: US 10,859,690 B2
(45) Date of Patent: Dec. 8, 2020

(54) RADAR APPARATUS

(71) Applicant: MITSUBISHI ELECTRIC CORPORATION, Tokyo (JP)

(72) Inventors: Ryuhei Takahashi, Tokyo (JP); Toru Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 204 days.

(21) Appl. No.: 16/093,430

(22) PCT Filed: Apr. 18, 2016

(86) PCT No.: PCT/JP2016/062247
§ 371 (c)(1),
(2) Date: Oct. 12, 2018

(87) PCT Pub. No.: WO2017/183080
PCT Pub. Date: Oct. 26, 2017

(65) Prior Publication Data

US 2019/0064336 A1 Feb. 28, 2019

(51) Int. Cl.

| | |
|---|---|
| ***G01S 13/28*** | (2006.01) |
| ***G01S 13/58*** | (2006.01) |
| ***G01S 13/42*** | (2006.01) |
| ***G01S 7/295*** | (2006.01) |
| ***G01S 7/288*** | (2006.01) |

(52) U.S. Cl.
CPC ............ *G01S 13/282* (2013.01); *G01S 7/295* (2013.01); *G01S 13/42* (2013.01); *G01S 13/582* (2013.01); *G01S 2007/2883* (2013.01)

(58) Field of Classification Search
CPC ...... G01S 13/42; G01S 13/282; G01S 13/582; G01S 13/28; G01S 13/58; G01S 7/52003;
(Continued)

(56) References Cited

U.S. PATENT DOCUMENTS

2007/0285315 A1* 12/2007 Davis .................. H01Q 3/2629 342/377
2012/0299773 A1* 11/2012 Stirling-Gallacher ... H01Q 3/34 342/368

(Continued)

OTHER PUBLICATIONS

Yang "High range resolution based on multi-carrier frequency MIMO radar" IET Conference Publications Apr. 22, 2009, ISBN 978-1-84919-010-7. (Year: 2009).*
Extended European Search Report issued in corresponding European Application No. 16899354.1 dated Feb. 18, 2019.

(Continued)

*Primary Examiner* — Erin F Heard
*Assistant Examiner* — Michael W Justice
(74) *Attorney, Agent, or Firm* — Birch, Stewart, Kolasch & Birch, LLP

(57) ABSTRACT

Pulse compression units (9-m) (m=1, . . . , M) obtain frequency spectra of received signals by performing Fourier transform on the received signals output from receiver devices (7-m), calculate spectrum products of references for pulse compression, the references determined by beam directional angles indicating propagation directions of transmission pulses and carrier frequencies, and the frequency spectra, and perform inverse Fourier transform on the spectrum products. This enables reduction in the calculation scale by reducing the number of times of execution of Fourier transform and inverse Fourier transform when pulse compression is performed.

7 Claims, 12 Drawing Sheets

(58) Field of Classification Search
CPC ............. G01S 7/52046; G01S 7/52047; H04B 7/0413; H04B 7/0456
USPC .................................................. 342/698, 196
See application file for complete search history.

(56) References Cited

U.S. PATENT DOCUMENTS

2013/0301454 A1* 11/2013 Seol ..................... H04B 7/0695 370/252
2013/0342383 A1* 12/2013 Kojima ................... G01S 7/023 342/134

OTHER PUBLICATIONS

Brookner, "MIMO radar demystified and where it makes sense to use," in Acoustics, Speech and Signal Processing (ICASSP), May 4-9, 2014 IEEE International Conference on Acoustic, pp. 5292-5296.
Dai et al., "Low-sidelobe HRR profiling based on the FDLFM-MIMO radar", in Synthetic Aperture Radar, 2007, APSAR 2007, 1st Asian and Pacific Conference on Nov. 5-9, 2007, pp. 132-135.
Melvin et al., Chapter 4: MIMO Radar, Principles of Modern Radar, vol. 2, Advanced Techniques, SciTech Publishing, Edison, NJ, 2013, Total 4 pages.
Rabideau et al., "Ubiquitous MIMO multifunction digital array radar" Lincoln Laboratory Project Report DAR-4, Massachusetts Institute of Technology, Mar. 2004, pp. 1057-1064.
Yang et al., "Thigh range resolution based on Multi-Carrier-Frequency MIMO Radar," in Radar Conference, 2009 IET International , Total 4 pages.

* cited by examiner

RADAR APPARATUS

TECHNICAL FIELD

The invention relates to a radar apparatus for emitting a plurality of transmission pulses having different carrier frequencies to space and then receiving reflected waves of the transmission pulses reflected by a target present in the space.

BACKGROUND ART

As radar devices for emitting a plurality of transmission pulses having different carrier frequencies to space and then receiving reflected waves of the transmission pulses reflected by a target present in the space, there are multi input multi output (MIMO) radar devices and the like.

When an MIMO radar device simultaneously emits a plurality of transmission pulses having different carrier frequencies from a plurality of transmission antennas and a plurality of reception antennas receives reflected waves of the transmission pulses, the MIMO radar device performs MIMO beam synthesis in which received signals of the respective reflected waves are synthesized while being subjected to pulse compression using the transmission pulses.

In the case where the number of pulses having different carrier frequencies is N (N is an integer greater than or equal to 2), N times of pulse compression is performed to perform MIMO beam synthesis.

Non-Patent Literature 1 listed below discloses the contents of pulse compression processing.

In the pulse compression processing disclosed in Non-Patent Literature 1, a convolution integral of a received signal and a reference which is a replica of a transmission pulse is performed.

In the case where high speed processing of pulse compression is required, a reference and a received signal are subjected to Fourier transform, the result of the Fourier transform of the reference and the result of the Fourier transform of the received signal are multiplied to obtain a spectrum product, and the spectrum product is subjected to inverse Fourier transform.

Therefore, in the case where N times of pulse compression is performed, the number of times of execution of Fourier transform and inverse Fourier transform totals 2×N times.

CITATION LIST

Non-Patent Literature

Non-Patent Literature 1: Yang, M. L.; Chen, B. X.; Qin, G. D.; Zhang, S. H., "High range resolution based on Multi-Carrier-Frequency MIMO Radar," in Radar Conference, 2009 IET International, vol., no., pp. 1-4, 20-22 Apr. 2009

SUMMARY OF INVENTION

Technical Problem

Since the radar devices in the related art are configured as described above, in the case where the number of pulses having different carrier frequencies is N, the number of times of execution of Fourier transform and inverse Fourier transform when N times of pulse compression is performed totals 2×N times. For this reason, there is a problem that the calculation scale increases.

The invention has been devised to solve the problem as described above, and an object of the invention is to provide a radar apparatus capable of reducing the calculation scale by reducing the number of times of execution of Fourier transform and inverse Fourier transform when pulse compression is performed.

Solution to Problem

A radar apparatus according to the invention includes: a pulse emitter configured to emit a plurality of transmission pulses having different carrier frequencies to space; a plurality of antennas configured to receive reflected waves of the transmission pulses that have been emitted from the pulse emitter and thereafter reflected by a target present in the space; a plurality of receiver devices configured to output received signals indicating the reflected waves received by the plurality of antennas; a plurality of pulse compression units configured to calculate frequency spectra of the received signals by performing Fourier transforms on the received signals output from the receiver devices, calculate spectrum products between the frequency spectra and references for pulse compressions, and perform inverse Fourier transforms on the spectrum products, the references being determined on a basis of the carrier frequencies and beam directional angles indicating propagation directions of the transmission pulses; and a received-beam synthesizing unit configured to synthesize received beams that are the spectrum products subjected to the inverse Fourier transforms in the plurality of pulse compression units, in accordance with the beam directional angles.

Advantageous Effects of Invention

According to the invention, a plurality of pulse compression units calculate frequency spectra of received signals by performing Fourier transforms on the received signals output from the receiver devices, and calculate spectrum products between the frequency spectra and references for pulse compressions which are determined on a basis of the carrier frequencies and beam directional angles indicating propagation directions of the transmission pulses. The pulse compression units further perform inverse Fourier transforms on the spectrum products. This allows for reduction in the calculation scale by reducing the number of times of executions of Fourier transforms and inverse Fourier transforms in pulse compressions.

BRIEF DESCRIPTION OF DRAWINGS

FIG. 4 is a hardware configuration diagram of a computer in the case where the pulse compression units 9-*m* (m=1, . . . , M) and a received-beam synthesizing unit 10 are implemented by software, firmware, or the like.

FIG. 5 is a flowchart illustrating a processing procedure in the case where components of the pulse compression units 9-*m* (m=1, . . . , M) and the received-beam synthesizing unit 10 are implemented by software, firmware, or the like.

DESCRIPTION OF EMBODIMENTS

To describe the invention further in detail, embodiments for carrying out the invention will be described below along the accompanying drawings.

First Embodiment

Figure 1:
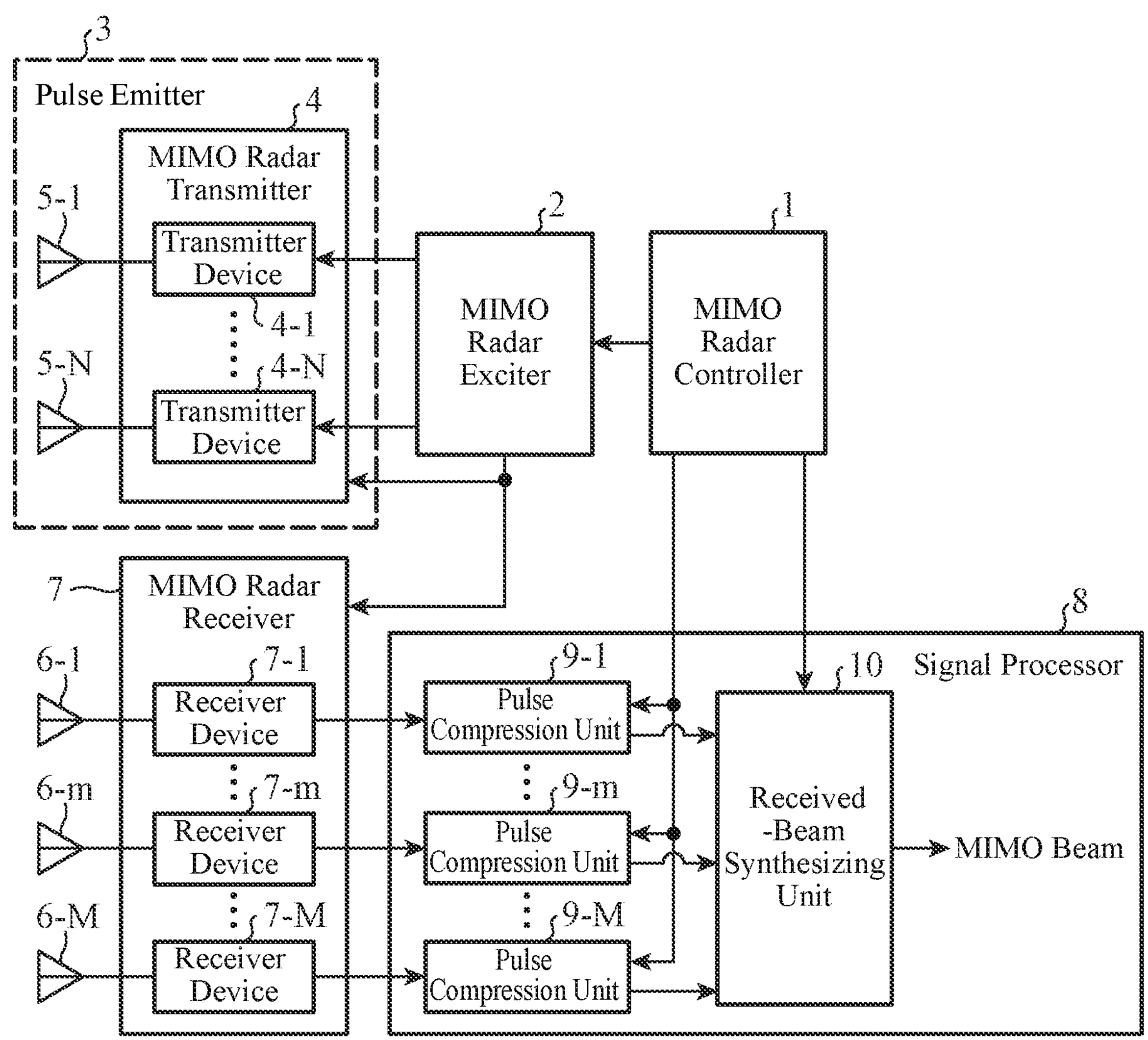
FIG. 1 is a configuration diagram illustrating a radar apparatus according to a first embodiment of the invention.

FIG. 1 is a configuration diagram illustrating a radar apparatus according to a first embodiment of the invention.

In FIG. 1, an MIMO radar controller 1 outputs radar control information such as carrier frequencies of N (N is an integer equal to or greater than 2) transmission pulses, beam directional angles indicating propagation directions of the transmission pulses and propagation directions of reflected waves of the transmission pulses reflected by a target, and timing signals indicating time for emitting the transmission pulses.

An MIMO radar exciter 2 generates N transmission pulses in accordance with the carrier frequencies included in the radar control information output from the MIMO radar controller 1, outputs the N transmission pulses to an MIMO radar transmitter 4, and further outputs the timing signal included in the radar control information to the MIMO radar transmitter 4 and an MIMO radar receiver 7.

A pulse emitter 3 includes the MIMO radar transmitter 4 and transmission antennas 5-1 to 5-N and emits N transmission pulses, having different carrier frequencies and output from the MIMO radar exciter 2, to space.

The MIMO radar transmitter 4 includes N transmitter devices 4-1 to 4-N, and the transmitter devices 4-1 to 4-N amplify transmission pulses output from the MIMO radar exciter 2 and outputs the amplified transmission pulses to the transmission antennas 5-1 to 5-N.

The transmission antennas 5-1 to 5-N emit transmission pulses output from the transmitter devices 4-1 to 4-N to space.

Reception antennas 6-1 to 6-M as M (M is a natural number) antennas receive reflected waves of the transmission pulses that are emitted from the transmission antennas 5-1 to 5-N and then reflected by a target present in the space.

The MIMO radar receiver 7 includes M receiver devices 7-1 to 7-M, and the receiver devices 7-1 to 7-M amplify received signals of the reflected waves received by the reception antennas 6-1 to 6-M and performs frequency conversion on frequencies of the received signals into base bands.

In addition, the receiver devices 7-1 to 7-M convert the received signals into digital signals and output the digital received signals to a signal processor 8.

The signal processor 8 includes pulse compression units 9-1 to 9-M and a received-beam synthesizing unit 10.

The pulse compression units 9-1 to 9-M perform pulse compression while separating target signals included in the digital received signals output from the receiver devices 7-1 to 7-M and synthesizing the N transmission pulses in accordance with the beam directional angles output from the MIMO radar controller 1.

That is, the pulse compression units 9-1 to 9-M perform processing to obtain frequency spectra of the digital received signals output from the receiver devices 7-1 to 7-M by performing Fourier transform on the received signals.

Furthermore, the pulse compression units 9-1 to 9-M perform processing of calculating spectrum products of references for pulse compression determined by the beam directional angles and the carrier frequencies output from the MIMO radar controller 1 and frequency spectra of the received signals and performing inverse Fourier transform on the spectrum products.

Note that the results of the inverse Fourier transform of the spectrum products are output to the received-beam synthesizing unit 10 from the pulse compression units 9-1 to 9-M as received beams.

The received-beam synthesizing unit 10 performs processing of synthesizing the received beams output from the pulse compression units 9-1 to 9-M in accordance with the beam directional angles output from the MIMO radar controller 1 and outputting an MIMO beam which is a signal synthesized from the received beams.

Figure 2:
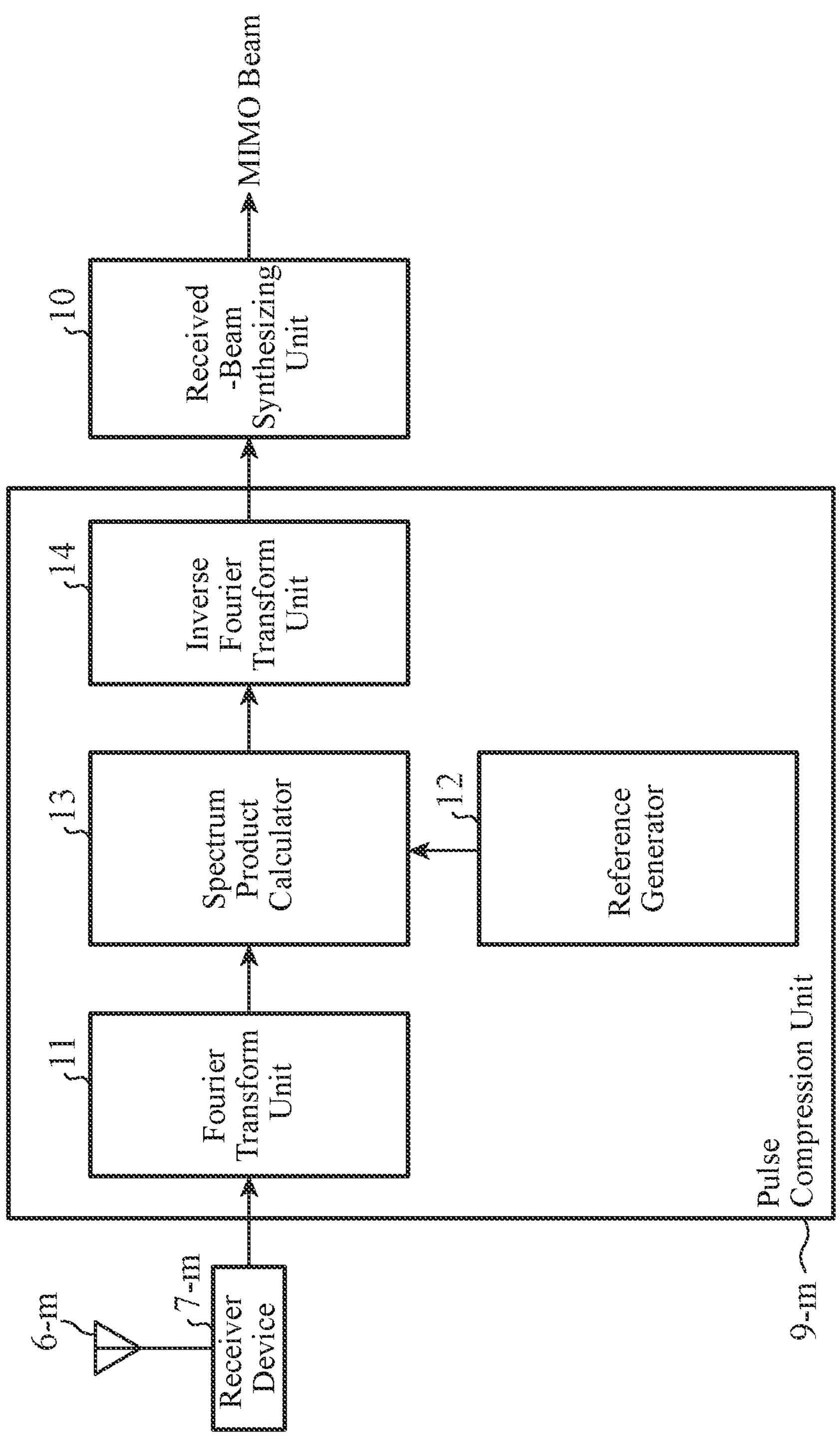
FIG. 2 is a configuration diagram illustrating pulse compression units 9-*m* (m=1, . . . , M) of a signal processor 8 in the radar apparatus according to the first embodiment of the invention.

FIG. 2 is a configuration diagram illustrating the pulse compression units 9-*m* (m=1, . . . , M) of the signal processor 8 in the radar apparatus according to a first embodiment of the invention.

Figure 3:
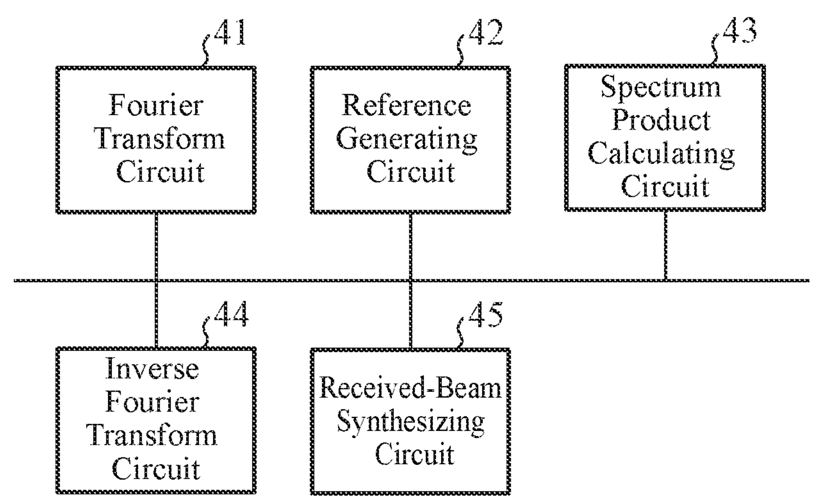
FIG. 3 is a hardware configuration diagram of the signal processor 8 in the radar apparatus according to the first embodiment of the invention.

In addition, FIG. 3 is a hardware configuration diagram of the signal processor 8 in the radar apparatus according to the first embodiment of the invention.

In FIGS. 2 and 3, a Fourier transform unit 11 is implemented by, for example, a Fourier transform circuit 41 illustrated in FIG. 3, and performs processing of obtaining a frequency spectrum of a digital received signal output from a receiver device 7-*m* by performing Fourier transform on the received signal.

A reference generator 12 is implemented by a reference generating circuit 42 illustrated in FIG. 3 for example, and performs processing of generating a reference for pulse compression determined by the beam directional angles and the carrier frequencies output from the MIMO radar controller 1.

A spectrum product calculator 13 is implemented by, for example, a spectrum product calculating circuit 43 illustrated in FIG. 3, and performs processing of calculating a spectrum product of the frequency spectrum obtained by the Fourier transform unit 11 and the reference generated by the reference generator 12.

An inverse Fourier transform unit 14 is implemented by, for example, an inverse Fourier transform circuit 44 illustrated in FIG. 3, and performs processing of performing inverse Fourier transform on the spectrum product calculated by the spectrum product calculator 13 and outputting the result of the inverse Fourier transform of the spectrum product as a received beam.

Note that the received-beam synthesizing unit 10 is implemented by, for example, a received-beam synthesizing circuit 45 illustrated in FIG. 3.

In FIG. 2, it is assumed that the Fourier transform unit 11, the reference generator 12, the spectrum product calculator 13, and the inverse Fourier transform unit 14, which are components of the pulse compression unit 9-*m* (m=1, . . . , M) and the received-beam synthesizing unit 10 are implemented by dedicated hardware as illustrated in FIG. 3, namely, the Fourier transform circuit 41, the reference generating circuit 42, the spectrum product calculating circuit 43, the inverse Fourier transform circuit 44, and the received-beam synthesizing circuit 45.

Here, the Fourier transform circuit 41, the reference generating circuit 42, the spectrum product calculating circuit 43, the inverse Fourier transform circuit 44, and the received-beam synthesizing circuit 45 may be a single circuit, a composite circuit, a programmed processor, a parallel-programmed processor, an application specific integrated circuit (ASIC), a field-programmable gate array (FPGA), or a combination thereof.

In this regard, the components of the pulse compression units 9-*m* (m=1, . . . , M) and the received-beam synthesizing unit 10 are not limited to those implemented by dedicated hardware, and the components of the pulse compression units 9-*m* and the received-beam synthesizing unit 10 may be implemented by software, firmware, or a combination of software and firmware.

The software or the firmware is stored in a memory of a computer as a program. Here, a computer refers to hardware for executing the program and may be, for example, a central processing unit (CPU), a central processing device, a processing device, an arithmetic device, a microprocessor, a microcomputer, a processor, a digital signal processor (DSP), or the like.

In addition, the memory of the computer may be a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disc, a flexible disc, an optical disc, a compact disc, a mini disc, a digital versatile disk (DVD), or the like.

Figure 4:
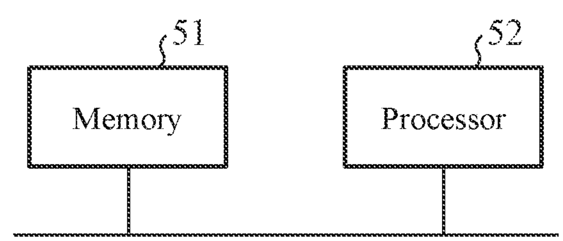

FIG. 4 is a hardware configuration diagram of a computer in the case where the pulse compression units 9-*m* (m=1, . . . , M) and the received-beam synthesizing unit 10 are implemented by software, firmware, or the like.

In the case where the components of the pulse compression unit 9-*m* and the received-beam synthesizing unit 10 are implemented by software, firmware, or the like, it is only required that a program for causing the computer to execute processing procedures of the Fourier transform unit 11, the reference generator 12, the spectrum product calculator 13, the inverse Fourier transform unit 14, and the received-beam synthesizing unit 10 be stored in a memory 51 and that a processor 52 of the computer execute the program stored in the memory 51.

Figure 5:
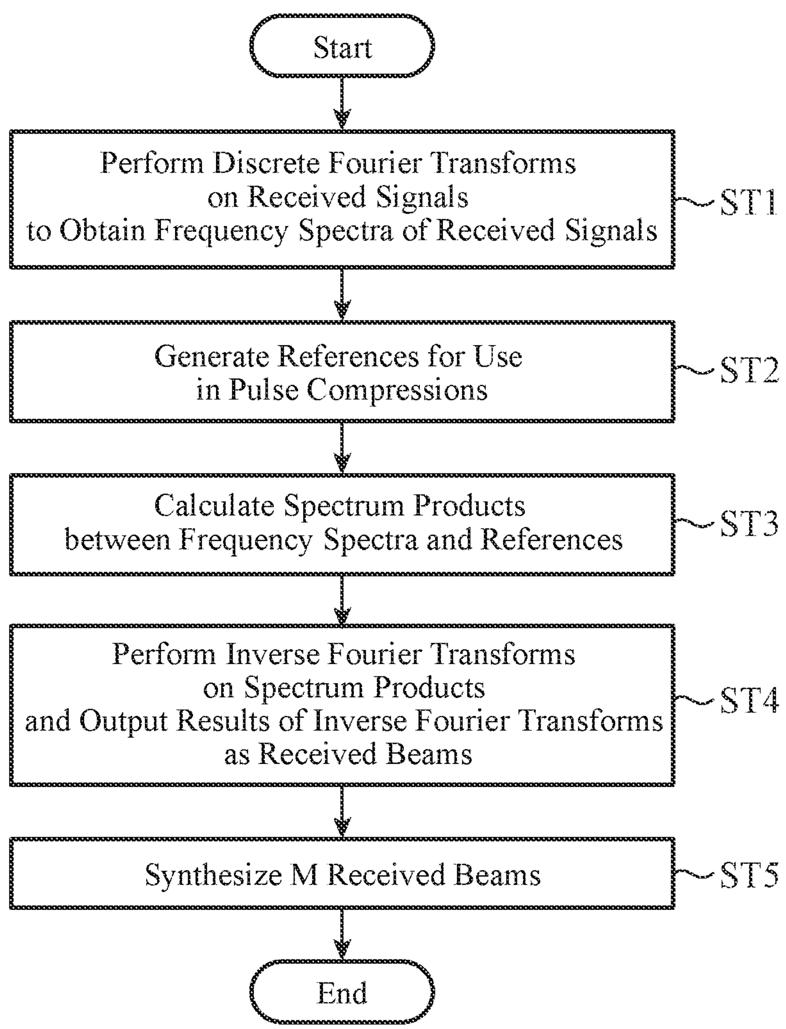

FIG. 5 is a flowchart illustrating a processing procedure in the case where components of the pulse compression units 9-*m* (m=1, . . . , M) and the received-beam synthesizing unit 10 are implemented by software, firmware, or the like.

FIG. 3 illustrates the example in which the components of the pulse compression units 9-*m* (m=1, . . . , M) and the received-beam synthesizing unit 10 are implemented by dedicated hardware, and FIG. 4 illustrates the example in which the components of the pulse compression units 9-*m* and the received-beam synthesizing unit 10 are implemented by software, firmware, or the like. Alternatively, a part of the components of the pulse compression units 9-*m* and the received-beam synthesizing unit 10 may be implemented by dedicated hardware and the rest of the components may be implemented by software, firmware, or the like.

Figure 6:
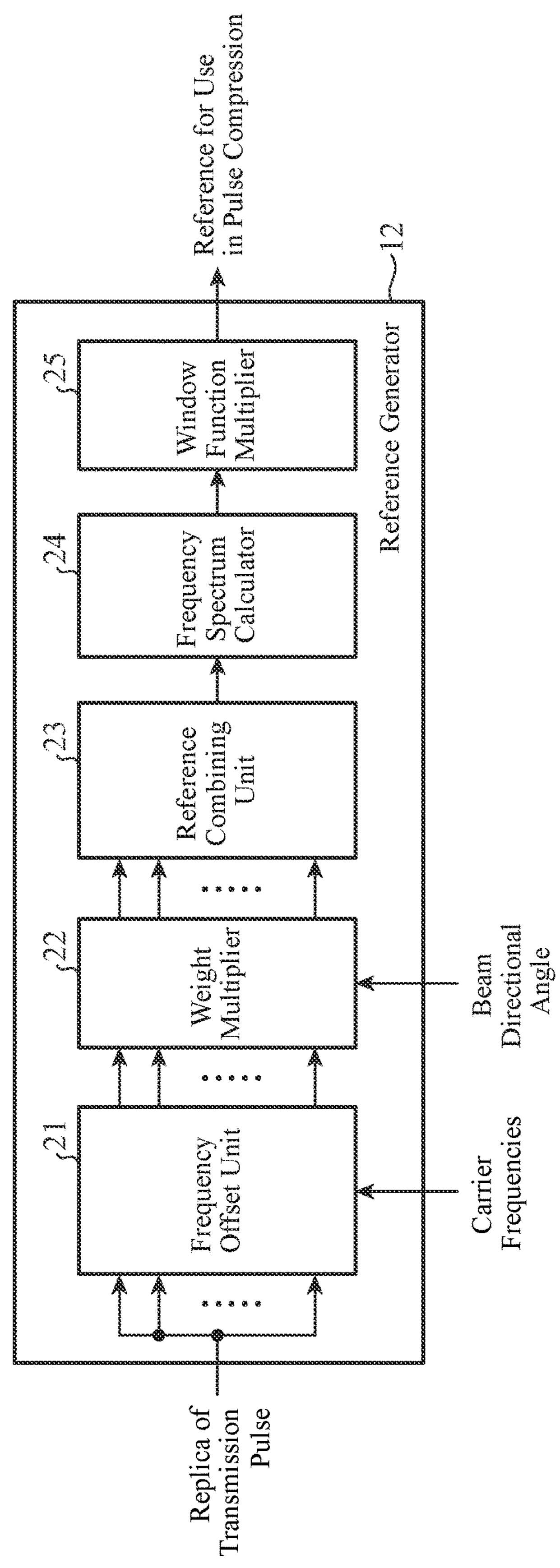
FIG. 6 is a configuration diagram illustrating a reference generator 12 in the radar apparatus according to the first embodiment of the invention.

FIG. 6 is a configuration diagram illustrating the reference generator 12 in the radar apparatus according to the first embodiment of the invention.

In FIG. 6, when N references are given as replicas of the transmission pulses, a frequency offset unit 21 performs processing of applying a plurality of offsets to the N references in accordance with the carrier frequencies output from the MIMO radar controller 1 and thereby obtaining N references having different frequencies. As a replica of a transmission pulse, for example, a transmission pulse output from the transmitter device 4-1 can be used.

A weight multiplier 22 performs processing of multiplying the N references obtained by the frequency offset unit 21 by transmission beam weights (weights) corresponding to a beam directional angle output from the MIMO radar controller 1.

A reference synthesizing unit 23 performs processing of synthesizing the N references multiplied by the transmission beam weights by the weight multiplier 22.

A frequency spectrum calculator 24 performs processing of calculating a frequency spectrum of the reference synthesized by the reference synthesizing unit 23.

A window function multiplier 25 performs processing of multiplying the frequency spectrum calculated by the frequency spectrum calculator 24 by a window function and outputting the frequency spectrum multiplied by the window function to the spectrum product calculator 13 as a reference for pulse compression.

Figure 7:
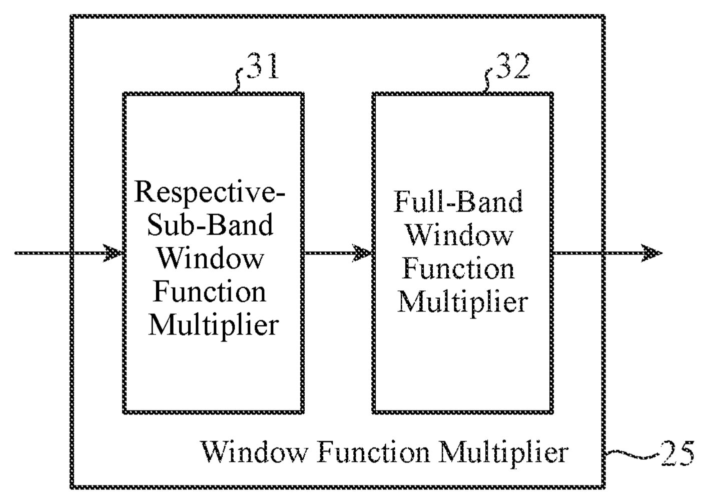
FIG. 7 is a configuration diagram illustrating a window function multiplier 25 in the radar apparatus according to the first embodiment of the invention.

FIG. 7 is a configuration diagram illustrating the window function multiplier 25 in the radar apparatus according to the first embodiment of the invention.

In FIG. 7, a respective sub-band window function multiplier 31 is a first window function multiplier that multiplies each sub-band of the frequency spectrum calculated by the frequency spectrum calculator 24 by a window function corresponding to the each sub-band.

A full-band window function multiplier 32 is a second window function multiplier that multiplies an output signal of the respective sub-band window function multiplier 31 by a window function corresponding to the entire frequency spectrum calculated by the frequency spectrum calculator 24.

In the example of FIG. 7, the respective sub-band window function multiplier 31 is provided preceding to the full-band window function multiplier 32. Alternatively, the respective sub-band window function multiplier 31 may be provided subsequent to the full-band window function multiplier 32.

Next, the operation will be described.

As expressed in the following mathematical formula (1), the MIMO radar controller 1 determines carrier frequencies $f_n^{(RF)}$(n=1, . . . , N) of N transmission pulses by adding frequency offset values $\Delta f_n$ (n=1, . . . , N) individually to a reference carrier frequency $f_0^{(RF)}$ having a wavelength of $\lambda$.

$$f_n^{(RF)}=f_0^{(RF)}+\Delta f_n \quad (1)$$

Then the MIMO radar controller 1 outputs, to the MIMO radar exciter 2 and the signal processor 8, radar control information such as carrier frequencies $f_n^{(RF)}$ of N transmission pulses, beam directional angles $\theta_b$ indicating propagation directions of the transmission pulses and propagation directions of reflected waves of the transmission pulses reflected by a target, and timing signals indicating time for emitting the transmission pulses.

When receiving the radar control information from the MIMO radar controller 1, the MIMO radar exciter 2 generates N transmission pulses $P_n^{(TX)}(t)$ (n=1, . . . , N) using N carrier frequencies $f_n^{(RF)}$ included in the radar control information as expressed in the following mathematical formula (2).

$$P_n^{(TX)}(t)=r(t)\exp(j2\pi f_n^{(RF)}t) \tag{2}$$

In mathematical formula (2), r(t) represents a pulse subjected to complex linear frequency modulation.

In the first embodiment, it is assumed that transmission and reception of H pulses are performed during a period (coherent processing interval (CPI) in which coherent integration is performed on the reflection pulses which are reflected waves of the transmission pulses reflected by a target.

Note that, pulse repetition intervals (PRIs) are equally spaced, and t represents observation time.

For example, in a first PRI, pulse propagation time between the transmission antennas 5-*n* (n=1, . . . , N) or the reception antennas 6-*m* (m=1, . . . , M), and the target is expressed as in the following mathematical formula (3).

$$\frac{2R_0}{c}+\frac{d_n^{(TX)}\sin\theta_0}{c}+\frac{d_m^{(RX)}\sin\theta_0}{c} \tag{3}$$

In mathematical formula (3), $R_0$ represents a distance from the center position in the transmission antennas 5-1 to 5-N and the reception antennas 6-1 to 6-M to the target present in the space, $\theta_0$ represents a target azimuth with an array normal used as a reference, $d_n^{(TX)}$ represents the position of the transmission antenna 5-*n* with the center position used as a reference, $d_m^{(RX)}$ represents the position of the reception antenna 6-*m* with the center position used as a reference, and c represents the speed of light.

After generating the N transmission pulses $P_n^{(TX)}(t)$ (n=1, . . . , N), the MIMO radar exciter 2 outputs the N transmission pulses $P_n^{(TX)}(t)$ to the MIMO radar transmitter 4 and outputs the timing signals included in the radar control information output from the MIMO radar controller 1 to the MIMO radar transmitter 4 and the MIMO radar receiver 7.

When receiving the transmission pulses $P_n^{(TX)}$ (n=1, . . . , N) from the MIMO radar exciter 2, the transmitter devices 4-*n* (n=1, . . . , N) of the MIMO radar transmitter 4 amplify the transmission pulses $P_n^{(TX)}$ and outputs the amplified transmission pulses $P_n^{(TX)}$ to the transmission antennas 5-1 to 5-N in synchronization with the timing signals output from the MIMO radar exciter 2.

As a result, the N transmission pulses $P_n^{(TX)}$ (n=1, . . . , N) are emitted from the transmission antennas 5-1 to 5-N into the space.

Reflection pulses $P_m^{(RX)}$, which are reflected waves of the transmission pulses reflected by a target present in the space after being radiated from the transmission antennas 5-1 to 5-N, are received by the reception antennas 6-1 to 6-M.

The receiver devices 7-*m* (m=1, . . . , M) of the MIMO radar receiver 7 amplify the received signals of the reflection pulses $P_m^{(RX)}$ received by the reception antennas 6-*m* and performs frequency conversion on frequencies of the received signals into base bands.

In addition, the receiver devices 7-*m* convert the received signals into digital signals and output the digital received signals to the signal processor 8.

Here, a target signal s-bar $_{n,\,m}$(t) for an h-th transmission pulse $Pr_n^{(TX)}(t)$, where carrier frequencies of the transmission pulses $P_n^{(TX)}(t)$ are $f_n^{(RF)}$ (n=1, . . . , N), is expressed by the following expression (4).

In the description of the specification, the symbol "-" cannot be placed over the letter "s" due to limitation of the electronic patent application, and thus it is noted as "s-bar".

$$\bar{s}_{n,m}(t)=r\left(t-h'T_{PRI}-\frac{2R_0}{c}\right)\exp(j2\pi f_n^{(RF)}t)\exp(j2\pi f_d t)\cdot \exp\left(-j2\pi f_n^{(RF)}\left(\frac{2R_0}{c}+\frac{d_n^{(TX)}\sin\theta_0}{c}+\frac{d_m^{(RX)}\sin\theta_0}{c}\right)\right) \tag{4}$$

In the expression (4), $T_{PRI}$ represents the pulse repetition interval PRI, and $f_d$ represents a Doppler frequency of a target signal at a radial velocity $v_0$. In order to simplify explanation, an amplitude due to distance attenuation or other causes is omitted here.

The Doppler frequency $f_d$ of a target signal is expressed by the following mathematical formula (5). Note that it is assumed that the difference due to a wavelength $\lambda_n$ of a carrier frequency $f_n^{(RF)}$ is negligible, and thus in the expression the wavelength $\lambda$ of the reference carrier frequency $f_0^{(RF)}$ is used.

$$f_d=\frac{2v_0}{\lambda} \tag{5}$$

Meanwhile, a difference between the transmission path of a transmission pulse and the reception path of a reflection pulse is expressed as a difference between the following expressions (6) and (7) where the wavelength $\lambda$ of the reference carrier frequency $f_0^{(RF)}$ is used.

$$\exp\left(-j\frac{2\pi f_n^{(RF)}d_n^{(TX)}\sin\theta_0}{c}\right)\approx\exp\left(-j\frac{2\pi d_n^{(TX)}\sin\theta_0}{\lambda}\right)\triangleq a_n^{(TX)} \tag{6}$$

$$\exp\left(-j\frac{2\pi f_n^{(RF)}d_m^{(RX)}\sin\theta_0}{c}\right)\approx\exp\left(-j\frac{2\pi d_m^{(RX)}\sin\theta_0}{\lambda}\right)\triangleq a_m^{(RX)} \tag{7}$$

Therefore, the target signal s-bar $_{n,\,m}$(t) represented by the expression (4) is given by the following expression (8).

$$\bar{s}_{n,m}(t)=a_n^{(TX)}a_m^{(RX)}r\left(t-h'T_{PRI}-\frac{2R_0}{c}\right)\exp(j2\pi f_n^{(RF)}t)\exp(j2\pi f_d t)\exp\left(-j\frac{4\pi R_0}{c}f_n^{(RF)}\right) \tag{8}$$

When the receiver devices 7-*m* (m=1, . . . , M) perform frequency conversion on a frequency of the target signal s-bar $_{n,\,m}$(t) of the expression (8), which is a received signal of a reflection pulse $P_m^{(RX)}$, using the reference carrier frequency $f_0^{(RF)}$ into a base band, a target signal $s_{n,m}(t)$ in a base band as expressed in the following expression (9) is obtained.

$$s_{n,m}(t) = a_n^{(TX)} a_m^{(RX)} r\left(t - h' T_{PRI} - \frac{2R_0}{c}\right) \exp(j2\pi(\Delta f_n + f_d)t) \exp\left(-j\frac{4\pi R_0}{c} f_n^{(RF)}\right) \tag{9}$$

In the first embodiment, assuming that the number of processing range bins per pulse repetition interval PRI is L samples, the target signal $s_{n,m}(t)$ is sampled at equal intervals $t_l^{(h)}$ as expressed in the following mathematical formula (10).

$$t_l^{(h)} = l' \cdot \Delta t + h' T_{PRI} = (l-1) \cdot \Delta t + (h-1) T_{PRI} \tag{10}$$

In mathematical formula (10), $\Delta t$ represents a sampling interval, and $\Delta t < T_{PRI}$ holds.

In addition, $l=1, \ldots, L$ represents the range bin number, and $l'=l-1$.

By sampling the target signal $s_{n,m}(t)$ of the expression (9) at the intervals $t_l^{(h)}$ expressed in the mathematical formula (10), a target signal $s_{n,m}[l, h]$ as expressed in the following expression (11) is obtained.

$$s_{n,m}[l,h] \triangleq s_{n,m}(t_l^{(h)}) = a_n^{(TX)} a_m^{(RX)} r\left(l'\Delta t - \frac{2R_0}{c}\right) \exp\left(-j\frac{4\pi R_0}{c} f_n^{(RF)}\right) \exp(j2\pi(\Delta f_n + f_d)h' T_{PRI}) \exp(j2\pi(\Delta f_n + f_d)l'\Delta t) \tag{11}$$

Let us consider discrete Fourier transform of the target signal $s_{n,m}[l, h]$ including L samples at an h-th pulse repetition interval PRI.

A term relating to "l" in the expression (11), that is, a frequency spectrum of a term expressed in the following expression (12) is given by the following expression (13).

$$r\left(l'\Delta t - \frac{2R_0}{c}\right) \exp(j2\pi(\Delta f_n + f_d)l'\Delta t) \tag{12}$$

$$\begin{bmatrix} R(f_1 - \Delta f_n - f_d)\exp\left(-j\frac{4\pi R_0}{c}(f_1 - \Delta f_n - f_d)\right) \\ R(f_2 - \Delta f_n - f_d)\exp\left(-j\frac{4\pi R_0}{c}(f_2 - \Delta f_n - f_d)\right) \\ \vdots \\ R(f_L - \Delta f_n - f_d)\exp\left(-j\frac{4\pi R_0}{c}(f_L - \Delta f_n - f_d)\right) \end{bmatrix} = \exp\left(j\frac{4\pi R_0}{c}(\Delta f_n + f_d)\right) r_n^{(f_n)}(R_0) \tag{13}$$

Note that $R(f_1)$ represents a frequency spectral component of $r(l' \Delta t)$, and $r_n^{(fd)}(R_0)$ is expressed by the following expression (14).

$$r_n^{(f_d)}(R_0) = \begin{bmatrix} R(f_1 - \Delta f_n - f_d)\exp\left(-j\frac{4\pi R_0}{c} f_1\right) \\ R(f_2 - \Delta f_n - f_d)\exp\left(-j\frac{4\pi R_0}{c} f_2\right) \\ \vdots \\ R(f_L - \Delta f_n - f_d)\exp\left(-j\frac{4\pi R_0}{c} f_L\right) \end{bmatrix} \tag{14}$$

Based on the expression (13), a frequency spectrum $s_{n,m}^{(h)}$ obtained by performing discrete Fourier transform on the target signal $s_{n,m}[l, h]$ including L samples at the h-th pulse repetition interval PRI is given by the following mathematical formula (15).

$$\begin{aligned} s_{n,m}^{(h)} &= \exp\left(j\frac{4\pi R_0}{c}(\Delta f_n + f_d)\right) r_n^{(f_d)}(R_0) a_n^{(TX)} a_m^{(RX)} \exp\left(-j\frac{4\pi R_0}{c} f_n^{(RF)}\right) \exp(j2\pi(\Delta f_n + f_d)h' T_{PRI}) \\ &= r_n^{(f_d)}(R_0) a_n^{(TX)} a_m^{(RX)} \exp\left(-j\frac{4\pi R_0}{c}(f_0^{(RF)} - f_d)\right) \exp(j2\pi(\Delta f_n + f_d)h' T_{PRI}) \end{aligned} \tag{15}$$

Considering that N target signals $s_{n,m}[l, h]$ include digital received signals $x_m[l, h]$ output from the receiver devices 7-*m* (m=1, . . . , M) to the signal processor 8 and that receiver noise $n_m[l, h]$ at the receiver devices 7-*m* is added, the digital received signals $x_m[l, h]$ is expressed by the following expression (16).

$$x_m[l, h] = \sum_{n=1}^{N} s_{n,m}[l, h] + n_m[l, h] \tag{16}$$

Here, for the sake of simplicity of ease, it is assumed that the number of targets is one, but in general, a plurality of target signals having various azimuths and Doppler frequencies is received.

When receiving a digital received signal $x_m[l, h]$ from a receiver device 7-*m*, a pulse compression unit 9-*m* (m=1, . . . , M) of the signal processor 8 performs Fourier transform on the received signal $x_m[l, h]$ to obtain a frequency spectrum of the received signal $x_m[l, h]$, calculates a spectrum product of a reference for pulse compression determined by a beam directional angle $\theta_b$ and a carrier frequency $f_n^{(RF)}$ output from the MIMO radar controller 1 and the frequency spectrum of the received signal $x_m[l, h]$, and performs inverse Fourier transform on the spectrum product.

The contents of the processing of a pulse compression unit 9-*m* (m=1, . . . , M) will be specifically described below.

When receiving a digital received signal $x_m[l, h]$ from the receiver device 7-*m*, the Fourier transform unit 11 of the pulse compression unit 9-*m* (m=1, . . . , M) obtains a frequency spectrum $x'^{(h)}_m$ of the received signal $x_m[l, h]$ as expressed in the following mathematical formula (17) by performing discrete Fourier transform on the received signal $x_m[l, h]$, and outputs the frequency spectrum $x'^{(h)}_m$ to the spectrum product calculator 13 (step ST1 in FIG. 5).

$$\begin{aligned} x_m'^{(h)} &= \sum_{n=1}^{N} s_{n,m}^{(h)} + n'_m \\ &= a_m^{(RX)} \exp\left(-j\frac{4\pi R_0}{c}(f_0^{(RF)} - f_d)\right) \sum_{n=1}^{N} r_n^{(f_d)}(R_0) a_n^{(TX)} \exp(j2\pi(\Delta f_n + f_d)h' T_{PRI}) + n'_m \end{aligned} \tag{17}$$

Care must be taken in mathematical formula (17) that phase rotation in a hit direction is expressed as $\exp(j2\pi(\Delta f_n +$ $f_d)h'T_{PRI})$. This is due to frequency conversion of the target signal in the RF band by the reference carrier frequency $f_0^{(RF)}$.

The reference generator 12 of the pulse compression unit 9-*m* (m=1, . . . , M) generates the reference for pulse compression determined by the beam directional angle $\theta_b$ and the carrier frequency $f_n^{(RF)}$ output from the MIMO radar controller 1 (step ST2 in FIG. 5). The reference for pulse compression is expressed by the following mathematical formula (18)

$$w_{win} \odot \left( \sum_{n=1}^{N} a_n^{(TXb)} \exp(j2\pi\Delta f_n h' T_{PRI}) r_n^0(0) \right) = \mathrm{diag}(w_{win}) \left( \sum_{n=1}^{N} a_n^{(TXb)} \exp(j2\pi\Delta f_n h' T_{PRI}) r_n^0(0) \right) \tag{18}$$

In mathematical formula (18), $w_{win}$ represents a window function vector for reduction of range side lobes. In addition, $a_n^{(TXb)}$ is a component relating to the beam directional angle $\theta_b$ with the array normal used as a reference.

$$a_n^{(TXb)} = \exp\left( -j \frac{2\pi d_n^{(TX)} \sin\theta_b}{\lambda} \right) \tag{19}$$

Hereinafter, the processing of generating the reference for pulse compression by the reference generator 12 will be specifically described.

When N references R are given as replicas of a transmission pulse, the frequency offset unit 21 of the reference generator 12 applies offsets to the N references in accordance with the carrier frequencies $f_n^{(RF)}$ output from the MIMO radar controller 1 and thereby obtains a plurality of references having different frequencies.

When the frequency offset unit 21 obtains the N references, the weight multiplier 22 of the reference generator 12 multiplies the N references by a transmission beam weight corresponding to the beam directional angle $\theta_b$ output from the MIMO radar controller 1 and outputs the N references multiplied by the transmission beam weights to the reference synthesizing unit 23.

The N references output from the weight multiplier 22 are expressed by the following mathematical formula (20).

$$a_n^{(TXb)} \exp(j2\pi\Delta f_n h' T_{PRI}) r_n^0(0) = a_n^{(TXb)} \exp(j2\pi\Delta f_n h' T_{PRI}) \begin{bmatrix} R(f_1 - \Delta f_n) \\ R(f_2 - \Delta f_n) \\ \vdots \\ R(f_L - \Delta f_n) \end{bmatrix} \tag{20}$$

where, (n=1, . . . , N).

The transmission beam weights corresponding to the beam directional angle $\theta_b$ is stored in an internal memory of the weight multiplier 22, for example. Specifically, for example, N transmission beam weights such as N transmission beam weights corresponding to a beam directional angle $\theta_b$ of 20 degrees and N transmission beam weights corresponding to a beam directional angle $\theta_b$ of 30 degrees are stored.

When receiving the N references multiplied by the transmission beam weights from the weight multiplier 22, the reference synthesizing unit 23 of the reference generator 12 synthesizes the N references by performing complex addition of the N references multiplied by the transmission beam weights as expressed in the following mathematical formula (21) and outputs the synthesized reference to the frequency spectrum calculator 24.

$$\sum_{n=1}^{N} a_n^{(TXb)} \exp(j2\pi\Delta f_n h' T_{PRI}) r_n^{(0)}(0) = \sum_{n=1}^{N} a_n^{(TXb)} \exp(j2\pi\Delta f_n h' T_{PRI}) \begin{bmatrix} R(f_1 - \Delta f_n) \\ R(f_2 - \Delta f_n) \\ \vdots \\ R(f_L - \Delta f_n) \end{bmatrix} \tag{21}$$

When receiving the synthesized reference from the reference synthesizing unit 23, the frequency spectrum calculator 24 of the reference generator 12 calculates a frequency spectrum of the reference and outputs the frequency spectrum of the reference to the window function multiplier 25.

When receiving the frequency spectrum of the reference from the frequency spectrum calculator 24, the window function multiplier 25 of the reference generator 12 multiplies the frequency spectrum by the window function vector $w_{win}$ for reduction of range side lobes and outputs the frequency spectrum multiplied by the window function vector win to the spectrum product calculator 13 as the reference for pulse compression expressed in mathematical formula (18).

Here, the window function vector $w_{win}$ for reduction of range side lobes will be described.

The synthesized reference output from the reference synthesizing unit 23 is a combination of the N references, and the frequency spectra of the N references are apart from each other by an offset applied by the frequency offset unit 21 on a frequency axis.

Hereinafter, each of bands occupied by the N references is referred to as a sub-band #n (n=1, . . . , N), and a frequency spectrum of a sub-band #n is referred to as a sub-band spectrum #n.

In the window function multiplier 25, a window function vector $w_n^{(sub)}$ for each sub-band spectrum in as well as a window function vector $w^{(full)}$ for the entire frequencies occupied by the synthesized reference are set as the window function vector $w_{win}$ for reduction of range side lobes.

The following mathematical formula (22) expresses the relationship among the window function vector $w_{win}$ for reduction of range side lobes and the window function vector $w_n^{(sub)}$ and the window function vector $w^{(full)}$.

$$w_{win} = \left( \sum_{n=1}^{N} w_n^{(sub)} \right) \odot w^{(full)} \tag{22}$$

As a result, cross-correlated range side lobes are mitigated by the window function for each of the sub-bands, thereby enabling achievement of pulse compression with low range side lobe characteristics.

The respective sub-band window function multiplier 31 of the window function multiplier 25 multiplies each of the sub-bands of the frequency spectrum calculated by the frequency spectrum calculator 24 by a window function corresponding to the each sub-band.

That is, the respective sub-band window function multiplier 31 multiplies each sub-band spectrum #n (n=1, . . . , N) by the window function vector $w_n^{(sub)}$ individually and outputs the sum of the multiplication results.

If N=4, for example, a sub-band spectrum #2 is multiplied by a window function vector $w_2^{(sub)}$. As a result, the sub-band spectrum #2 is multiplied by the window function vector $w_2^{(sub)}$, and sub-band spectra #1, #3, and #4 have values approximately equal to zero.

Furthermore, for example, the sub-band spectrum #3 is multiplied by a window function vector $w_3^{(sub)}$. As a result, the sub-band spectrum #3 is multiplied by the window function vector $w_3^{(sub)}$, and the sub-band spectra #1, #2, and #4 have values approximately equal to zero.

The full-band window function multiplier 32 of the window function multiplier 25 multiplies the entire output signal of the respective sub-band window function multiplier 31 by the window function.

That is, the full-band window function multiplier 32 multiplies the entire the sub-band spectra #1 to #N by the window function vector $w^{(full)}$.

When receiving the frequency spectrum $x'_m{}^{(h)}$ of the received signal $x_m[1, h]$ from the Fourier transform unit 11 and receiving the reference for pulse compression expressed by the mathematical formula (18) from the reference generator 12, as expressed in the following mathematical formula (23), the spectrum product calculator 13 of the pulse compression unit 9-*m* (m=1, . . . , M) calculates a spectrum product $x_m^{(\Theta b,h)}$ of the frequency spectrum $x'_m{}^{(h)}$ and the reference for pulse compression (step ST3 in FIG. 5).

$$x_m^{(\theta_b,h)} = \mathrm{diag}(w_{win})\mathrm{diag}\left(\sum_{n=1}^{N} a_n^{(Txb)}\exp(j2\pi\Delta f_n h' T_{PRI})r_n^{(0)}(0)\right)^H x_m'^{(h)} \tag{23}$$

For the sake of simplicity of explanation below, noise $n_m'$ included in the frequency spectrum $x'm^{(h)}$ is ignored. Ignoring the noise $n_m'$ included in the frequency spectrum $x'_m{}^{(h)}$, the spectrum product $x_m^{(\Theta b,h)}$ expressed in the mathematical formula (23) is given by the following mathematical formula (24).

$$\begin{aligned} x_m^{(\theta_b,h)} &= \mathrm{diag}(w_{win})\mathrm{diag}\left(\sum_{i=1}^{N} a_j^{(TXb)}\exp(j2\pi\Delta f_i h' T_{PRI})r_i^{(0)}(0)\right)^H \\ &\quad \sum_{j=1}^{N} s_{j,m}^{(h)} \\ &= a_m^{(RX)}\exp\left(-j\frac{4\pi R_0}{c}(f_0^{(RF)} - f_d)\right)\mathrm{diag}(w_{win})\cdot \\ &\quad \mathrm{diag}\left(\sum_{i=1}^{N} a_i^{(TXb)}\exp(j2\pi\Delta f_i h' T_{PRI})r_i^{(0)}(0)\right)^H \\ &\quad \sum_{j=1}^{N} r_i^{(f_j)}(R_0)a_j^{(TX)}\exp(j2\pi(\Delta f_j + f_d)h' T_{PRI} \end{aligned} \tag{24}$$

Here, when i≠j, it is assumed that the relationship of the following expression (25) holds. That is, it is assumed that the relationship of the following mathematical formula (25) holds for a spectrum product using references of different transmission pulses.

$$(r_i^{(0)}(0))^* \odot r_j^{(fd)} R_0) \approx 0 \tag{25}$$

If the mathematical formula (25) holds, the spectrum product $x_m^{(\Theta b,h)}$ expressed by mathematical formula (24) is given by the following expression (26).

$$\begin{aligned} x_m^{(\theta_b,h)} &= \mathrm{diag}(w_{win})\sum_{n=1}^{N}\mathrm{diag}(a_n^{(TXb)}\exp(j2\pi\Delta f_n h' T_{PRI})r_n^{(0)}(0))^H s_{n,m}^{(h)} \\ &= a_m^{(RX)}\exp\left(-j\frac{4\pi R_0}{c}(f_0^{(RF)} - f_d)\right)\exp(j2\pi f_d h' T_{PRI}) \\ &\quad \mathrm{diag}(w_{win})\sum_{n=1}^{N}\overline{a}_n^{(f_d)} b_n^{(TX)}(\Delta\theta) \end{aligned} \tag{26}$$

In expression (26), Δθ represents an off boresight angle which is a difference between the beam directional angle $\theta_b$ and the target azimuth $\theta_0$, and $b_n^{(TX)}(\Delta\theta)$ is expressed by the following expression (27).

Hereinafter, the case where Δθ≠0 is referred to as an off boresight target, and the case where Δθ=0 is referred to as an on boresight target.

$$b_n^{(TX)}(\Delta\theta) = (a_n^{(TXb)})^* a_n^{(TX)} = \exp\left(j\frac{2\pi d_n^{(TX)}(\sin\theta_b - \sin\theta)}{\lambda}\right) \tag{27}$$

$$\Delta\theta = \sin\theta_b - \sin\theta_0 \tag{28}$$

In addition, a-tilde $n_n^{(fd)}$ represents a steering vector related to a distance $R_0$ and the Doppler frequency $f_d$ as expressed in the following expression (29).

In the description of the specification, the symbol "~" cannot be placed over the letter "a" due to limitation of the electronic patent application, and thus it is noted as "a-tilde".

$$\begin{aligned} \tilde{a}_n^{(f_d)} &= (r_n^{(0)}(0))^* \odot r_n^{(f_d)}(R_0) \\ &= D_n(f_d)a(R_0) \end{aligned} \tag{29}$$

In the expression (29), $D_n(f_d)$ represents a diagonal matrix related to the Doppler frequency $f_d$ expressed in the following expression (30), and $a(R_0)$ represents a steering vector related to the distance $R_0$ as expressed in the following expression (31).

$$\begin{aligned} D_n(f_d) = \mathrm{diag}(&R^*(f_1 - \Delta f_n)R(f_1 - \Delta f_n - f_d), \ldots, \\ &R^*(f_L - \Delta f_n)R(f_L - \Delta f_n - f_d)) \end{aligned} \tag{30}$$

$$a(R_0) = \left[\exp\left(-j\frac{4\pi R_0}{c}f_1\right)\exp\left(-j\frac{4\pi R_0}{c}f_2\right)\ldots\exp\left(-j\frac{4\pi R_0}{c}f_L\right)\right]^T \tag{31}$$

From the relationships of expressions (29) to (31), the spectrum product $x_m^{(\Theta b,h)}$ expressed in expression (26) is given by the following expression (32).

$$\begin{aligned} x_m^{(\theta_b,h)} &= a_m^{(RX)}\exp\left(-j\frac{4\pi R_0}{c}(f_0^{(RF)} - f_d)\right) \\ &\quad \exp(j2\pi f_d h' T_{PRI})\mathrm{diag}(w_{win})\left(\sum_{n=1}^{N} b_n^{(TX)}(\Delta\theta)D_n(f_d)\right)a(R_0) \end{aligned} \tag{32}$$

The spectrum product $x_m^{(\theta_b, h)}$ expressed in expression (32) is a general form of vector representation of a spectrum product which is an output of the spectrum product calculator 13.

When receiving the spectrum product $x_m^{(\theta b,h)}$ expressed in expression (32) from the spectrum product calculator 13, the inverse Fourier transform unit 14 of the pulse compression unit 9-*m* (m=1, . . . , M) performs inverse Fourier transform accompanied with transmission beam synthesis on the spectrum product $x_m^{(\theta b,h)}$ and outputs the result of the inverse Fourier transform to the received-beam synthesizing unit 10 as a received beam (step ST4 in FIG. 5).

In the first embodiment, it is assumed that the following approximations (33) hold with respect to the Doppler frequency $f_d$ and the target azimuth $\theta_0$.

$$f_d \approx 0 \text{ and } \theta_0 \approx \theta_b \tag{33}$$

Here, the spectrum product $x_m^{(\theta b,h)}$ expressed in the expression (32) is given by the following expression (34).

$$x_m^{(\theta_b,h)} = a_m^{(RX)} \exp\left(-j\frac{4\pi R_0}{c} f_0^{(RF)}\right) \text{diag}(w_{win}) a(R_0) \tag{34}$$

In expression (34), the phase of $a(R_0)$ shows a linear change with respect to a frequency sample direction $f_1$ corresponding to the distance $R_0$, and the phase of the spectrum product $x_m^{(\theta b,h)}$ also linearly changes in a similar manner. It is therefore understood that the transmission beam synthesis accompanied with the window function $w_{win}$ and pulse compression are simultaneously performed by the inverse Fourier transform.

A synthesized output $z_m^{(\theta b)}(R)$ of a transmission beam for a desired distance R can be obtained by multiplication of the spectrum product $x_m^{(\theta b,h)}$ by a weight vector $w_{PC}(R)$ expressed in the following expression (35).

$$w_{PC}(R) = a(R) \tag{35}$$

Therefore, the synthesized output $z_m^{(\theta b)}(R)$ of the transmission beam is given by the following expression (36).

$$\begin{aligned} z_m^{(\theta_b)}(R) &= w_{PC}(R)^H x_m^{(\theta_b,h)} \\ &= a_m^{(RX)} \exp\left(-j\frac{4\pi R_0}{c} f_0^{(RF)}\right) a(R)^H \text{diag}(w_{win}) a(R_0) \end{aligned} \tag{36}$$

Here in expression (36), the sum of components phases of which are synthesized with respect to the transmission beam azimuth is also obtained simultaneously, and transmission beam is also synthesized.

At the time of implementation, the calculation of expression (36) is performed for each range bin using inverse Fourier transform. The calculation result of expression (36) obtained for each range bin is an output signal of the inverse Fourier transform unit 14.

When receiving received beams from the inverse Fourier transform unit 14 of the pulse compression units 9-1 to 9-M, the received-beam synthesizing unit 10 synthesizes M received beams in accordance with the beam directional angle $\theta_b$ output from the MIMO radar controller 1 as expressed in the following mathematical formula (37) and outputs an MIMO beam which is a synthesized signal of the received beams to the outside (step ST5 in FIG. 5).

$$Z^{(\theta_b)}(R) = \sum_{m=1}^{M} (a_m^{(RX)})^* a_m^{(RX)} \exp\left(-j\frac{4\pi R_0}{c} f_0^{(RF)}\right) a(R)^H \text{diag}(w_{win}) a(R_0) \tag{37}$$

As is apparent from the above, according to the first embodiment, the pulse compression unit 9-*m* (m=1, . . . , M) perform inverse Fourier transform on spectrum products by obtaining frequency spectra of received signals by performing Fourier transform on the received signals output from receiver devices 7-*m* and calculating the spectrum products of references for pulse compression, the references determined by beam directional angles indicating propagation directions of transmission pulses and carrier frequencies, and the frequency spectra, and thus there is an effect of enabling reduction in the calculation scale by reducing the number of times of execution of Fourier transform and inverse Fourier transform when pulse compression is performed.

That is, the received-beam synthesizing unit 10 can generate the MIMO beam even though in the pulse compression unit 9-*m* Fourier transform is performed only once and inverse Fourier transform is performed only once, and thus the calculation scale can be reduced.

Furthermore, according to the first embodiment, the reference generator 12 of the pulse compression unit 9-*m* includes the window function multiplier 25 that multiplies the frequency spectrum calculated by the frequency spectrum calculator 24 by the window functions and outputs the frequency spectrum multiplied by the window functions to the spectrum product calculator 13 as a reference for pulse compression, and thus this achieves an effect of implementing reduction of range side lobes of the MIMO beam.

Second Embodiment

In the first embodiment, the example in which the pulse compression unit 9-*m* (m=1, . . . , M) includes the Fourier transform unit 11, the reference generator 12, the spectrum product calculator 13, and the inverse Fourier transform unit 14 has been described. In a second embodiment, as illustrated in FIG. 8, a pulse compression unit 9-*m* (m=1, . . . , M) may include a Fourier transform unit 11, a reference generator 61, spectrum product calculators 62-1 to 62-N, inverse Fourier transform units 63-1 to 63-N, and a received-beam outputting unit 64.

Figure 8:
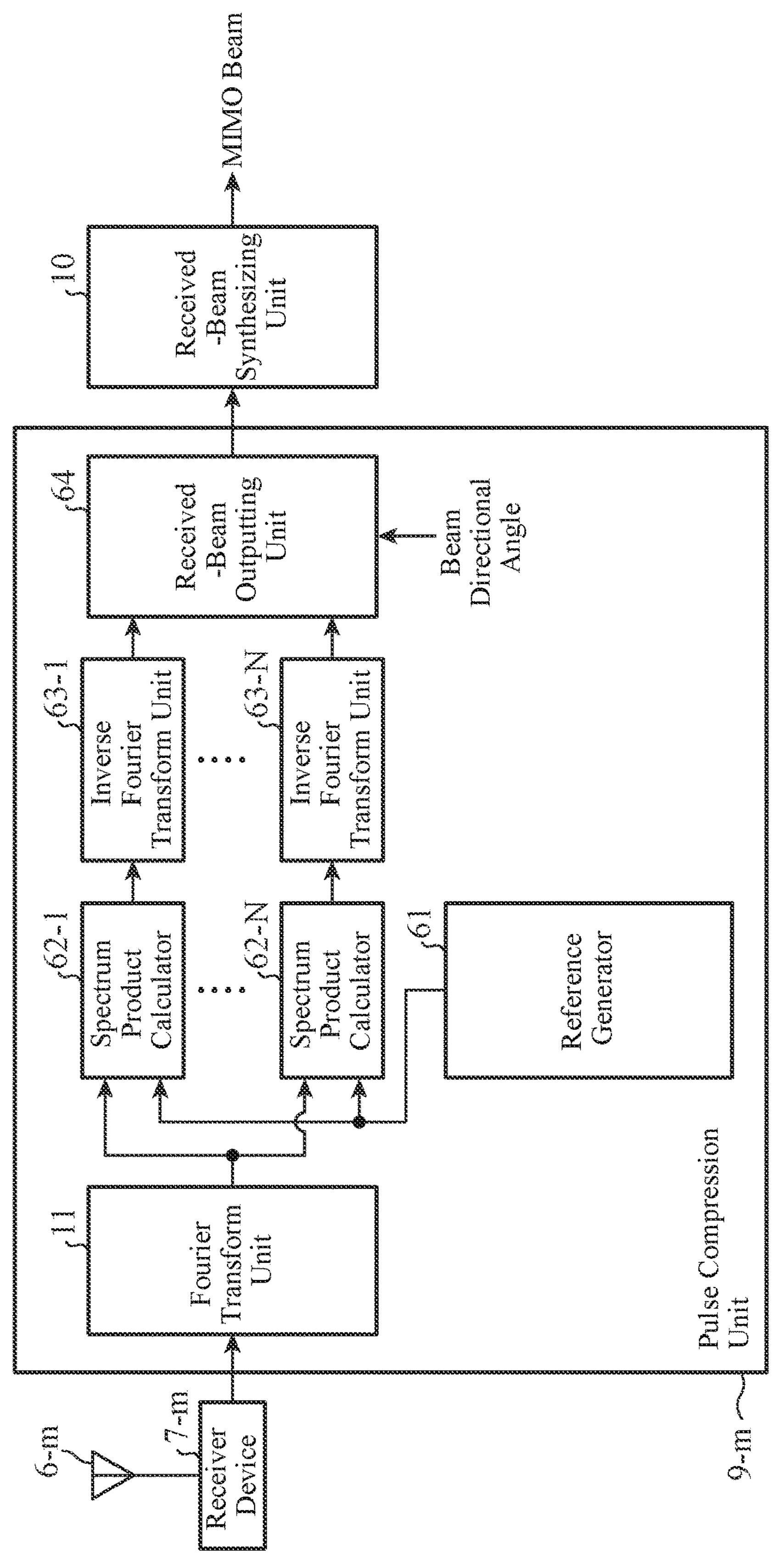
FIG. 8 is a configuration diagram illustrating pulse compression units 9-*m* (m=1, . . . , M) of a signal processor 8 in a radar apparatus according to a second embodiment of the invention.

FIG. 8 is a configuration diagram illustrating the pulse compression unit 9-*m* (m=1, . . . , M) of a signal processor 8 in a radar apparatus according to the second embodiment of the invention.

Figure 9:
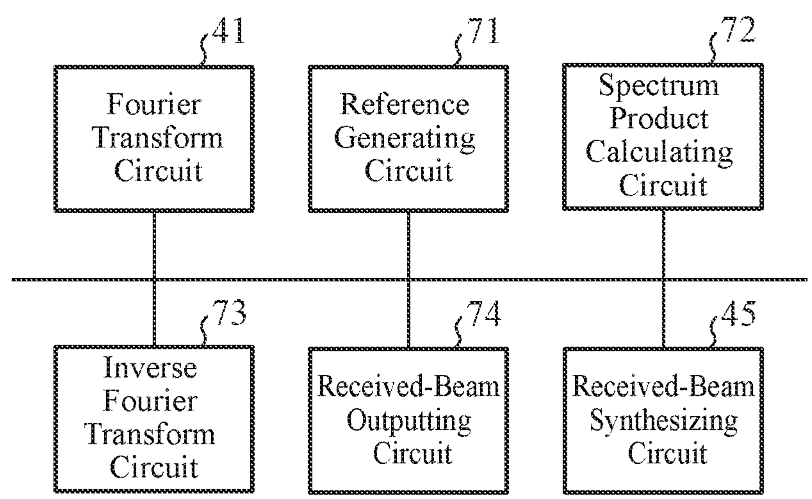
FIG. 9 is a hardware configuration diagram of the signal processor 8 in the radar apparatus according to the second embodiment of the invention.

In addition, FIG. 9 is a hardware configuration diagram of the signal processor 8 in the radar apparatus according to the second embodiment of the invention.

In FIGS. 8 and 9, the same symbol as that in FIGS. 2 and 3 represents the same or a corresponding part and thus descriptions thereon are omitted.

The reference generator 61 is implemented by a reference generating circuit 71 illustrated in FIG. 9 for example, and performs processing of generating a reference for pulse compression determined by carrier frequencies output from an MIMO radar controller 1 for each of sub-bands #n (n=1, . . . , N) in which a frequency spectrum of a received signal is present.

The spectrum product calculator 62-*n* (n=1, . . . , N) is implemented by, for example, a spectrum product calculating circuit 72 illustrated in FIG. 9, and performs processing of calculating a spectrum product of a spectral component in the sub-band #n, out of spectral components of the plurality of sub-bands in a frequency spectrum obtained by the Fourier transform unit 11, and the reference for the sub-band #n generated by the reference generator 61.

The inverse Fourier transform unit 63-*n* (n=1, . . . , N) is implemented by, for example, an inverse Fourier transform circuit 73 illustrated in FIG. 9, and performs processing of performing inverse Fourier transform on the spectrum product calculated by the spectrum product calculator 62-*n*.

The received-beam outputting unit 64 is implemented by, for example, a received-beam outputting circuit 74 illustrated in FIG. 9, and performs processing of synthesizing results of the inverse Fourier transform by the inverse Fourier transform units 63-1 to 63-N in accordance with beam directional angles output from the MIMO radar controller 1, and outputting the result obtained by synthesizing the inverse Fourier transform results to the received-beam synthesizing unit 10 as a received beam.

In FIG. 8, it is assumed that the Fourier transform unit 11, the reference generator 61, the spectrum product calculators 62-1 to 62-N, the inverse Fourier transform units 63-1 to 63-N, and the received-beam outputting unit 64, which are components of the pulse compression unit 9-*m* (m=1, . . . , M) and the received-beam synthesizing unit 10 are implemented by dedicated hardware as illustrated in FIG. 9, namely, the Fourier transform circuit 41, the reference generating circuit 71, the spectrum product calculating circuit 72, the inverse Fourier transform circuit 73, the received-beam outputting circuit 74, and the received-beam synthesizing circuit 45.

Here, the Fourier transform circuit 41, the reference generating circuit 71, the spectrum product calculating circuit 72, the inverse Fourier transform circuit 73, the received-beam outputting circuit 74, and the received-beam synthesizing circuit 45 may be a single circuit, a composite circuit, a programmed processor, a parallel-programmed processor, an ASIC, an FPGA, or a combination thereof.

In this regard, the components of the pulse compression units 9-*m* (m=1, . . . , M) and the received-beam synthesizing unit 10 are not limited to those implemented by dedicated hardware, and the components of the pulse compression units 9-*m* and the received-beam synthesizing unit 10 may be implemented by software, firmware, or a combination of software and firmware.

In the case where the components of the pulse compression unit 9-*m* and the received-beam synthesizing unit 10 are implemented by software, firmware, or the like, it is only required that a program for causing the computer to execute processing procedures of the Fourier transform unit 11, the reference generator 61, the spectrum product calculators 62-1 to 62-N, the inverse Fourier transform units 63-1 to 63-N, the received-beam outputting unit 64, and the received-beam synthesizing unit 10 be stored in the memory 51 illustrated in FIG. 4 and that the processor 52 of the computer execute the program stored in the memory 51.

Figure 10:
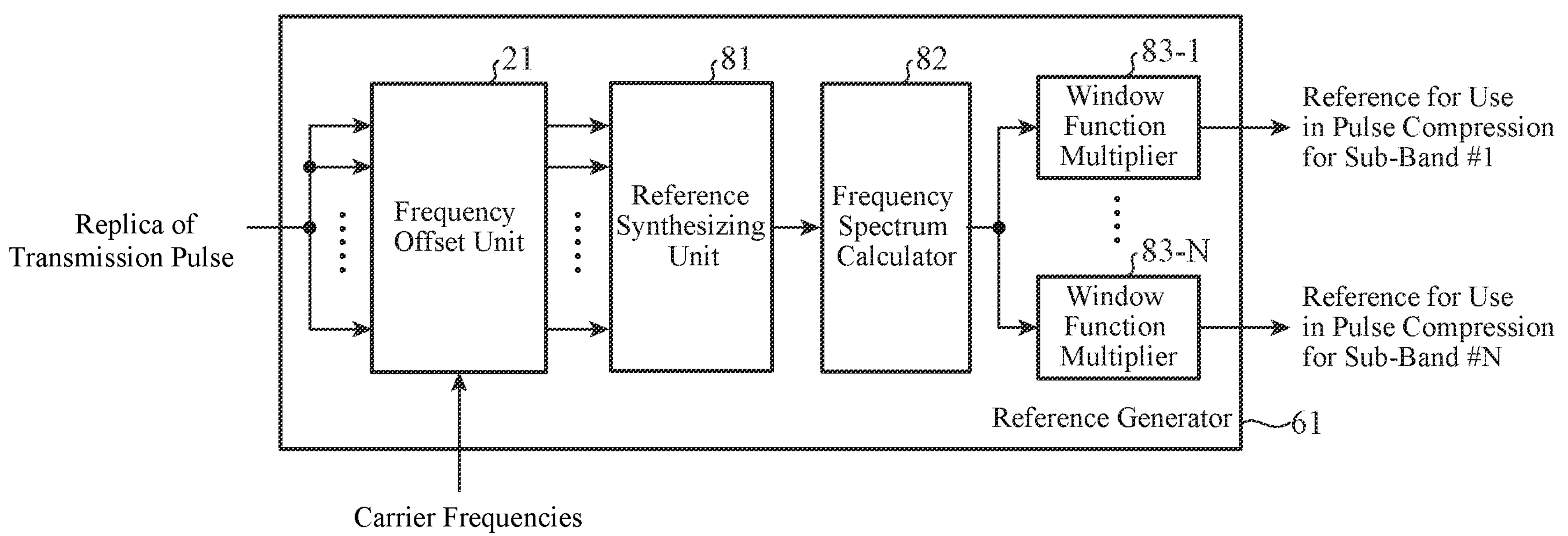
FIG. 10 is a configuration diagram illustrating a reference generator 61 in the radar apparatus according to the second embodiment of the invention.

FIG. 10 is a configuration diagram illustrating the reference generator 61 in the radar apparatus according to the second embodiment of the invention. In FIG. 10, the same symbol as that in FIG. 6 represents the same or a corresponding part and thus descriptions thereon are omitted.

A reference synthesizing unit 81 performs processing of synthesizing N references obtained by a frequency offset unit 21.

A frequency spectrum calculator 82 performs processing of calculating a frequency spectrum of the reference synthesized by the reference synthesizing unit 81.

Out of spectral components of a plurality of sub-bands in the frequency spectrum calculated by the frequency spectrum calculator 82, a window function multiplier 83-*n* (n=1, . . . , N) performs processing of multiplying a spectral component of a sub-band #n (n=1, . . . , N) by a window function and outputting the spectral component multiplied by the window function to the spectrum product calculator 62-*n* (n=1, . . . , N) as a reference for pulse compression in the sub-band #n.

Figure 11:
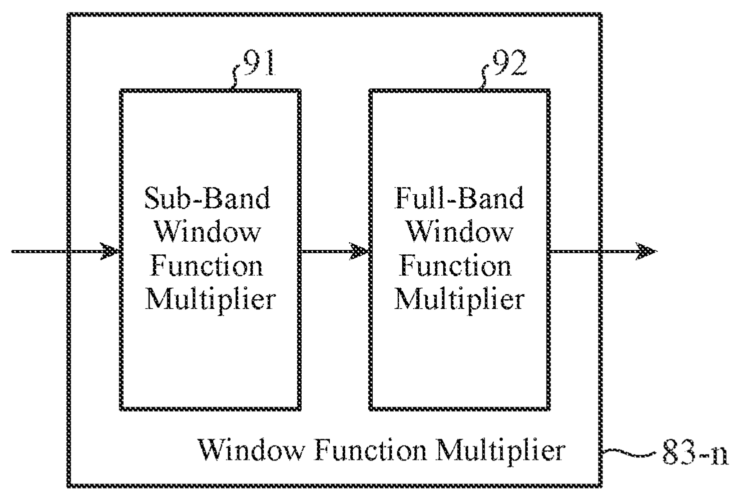
FIG. 11 is a configuration diagram illustrating window function multipliers 83-*n* (n=1, . . . , N) in a radar apparatus according to the second embodiment of the invention.

FIG. 11 is a configuration diagram illustrating a window function multiplier 83-*n* (n=1, . . . , N) in the radar apparatus according to the second embodiment of the invention.

In FIG. 11, a sub-band window function multiplier 91 is a first window function multiplier that multiplies the spectral component in the sub-band #n (n=1, . . . , N), out of the spectral components of the plurality of sub-bands in the frequency spectrum calculated by the frequency spectrum calculator 82, by a window function corresponding to the sub-band #n.

A full-band window function multiplier 92 is a second window function multiplier that multiplies an output signal of the sub-band window function multiplier 91 by a window function corresponding to the entire frequency spectrum calculated by the frequency spectrum calculator 82.

In the example of FIG. 11, the sub-band window function multiplier 91 is provided preceding to the full-band window function multiplier 92. Alternatively, the sub-band window function multiplier 91 may be provided subsequent to the full-band window function multiplier 92.

Next, the operation will be described.

Since the operation is similar to that of the first embodiment except for that of the pulse compression unit 9-*m* (m=1, . . . , M), the contents of processing of the pulse compression unit 9-*m* will mainly be described here.

When receiving a digital received signal $x_m[l, h]$ from a receiver device 7-*m*, the Fourier transform unit 11 of the pulse compression unit 9-*m* (m=1, . . . , M) obtains a frequency spectrum $x'_m{}^{(h)}$ of the received signal $x_m[l, h]$ as expressed in the above mathematical formula (17) by performing discrete Fourier transform on the received signal $x_m[l, h]$ like in the first embodiment described above, and outputs the frequency spectrum $x'_m{}^{(h)}$ to the spectrum product calculators 62-1 to 62-N.

The reference generator 61 of the pulse compression unit 9-*m* (m=1, . . . , M) generates a reference for pulse compression determined by a carrier frequency $f_n^{(RF)}$ output from the MIMO radar controller 1 for each of the sub-bands #n (n=1, . . . , N) in which the frequency spectrum $x'_m{}^{(h)}$ of the received signal $x_m[l,h]$ is present. That is, references for pulse compression in the sub-bands #1 to #N are generated. The references for pulse compression in the sub-bands #1 to #N are expressed by the following expression (38).

$$w_{win}^{(n)} \odot \left( \sum_{n=1}^{N} \exp(j2\pi\Delta f_n h' T_{PRI}) r_n^0(0) \right) = \mathrm{diag}(w_{win}^{(n)}) \left( \sum_{n=1}^{N} \exp(j2\pi\Delta f_n h' T_{PRI}) r_n^0(0) \right) = \exp(j2\pi\Delta f_n h' T_{PRI}) \mathrm{diag}(w_{win}^{(n)}) r_n^{(0)}(0) \tag{38}$$

-continued $$\sum_{n=1}^{N}\exp(j2\pi\Delta f_n h' T_{PRI})r_n^{(0)}(0) = \sum_{n=1}^{N}\exp(j2\pi\Delta f_n h' T_{PRI})\begin{bmatrix} R(f_1-\Delta f_n) \\ R(f_2-\Delta f_n) \\ \vdots \\ R(f_L-\Delta f_n) \end{bmatrix} \tag{39}$$

In expression (38), $w_{win}^{(n)}$ denotes a window function vector for reduction of range side lobes in the sub-band #n, and is regarded as 0 in sub-bands other than the sub-band #n.

Note that the references for pulse compression in the sub-bands #1 to #N are different in that a component $a_n^{(TXb)}$ related to the beam directional angle $\theta_b$ is not included as compared with the reference for pulse compression expressed in mathematical formula (18) in the first embodiment.

Hereinafter, the processing of generating the reference for pulse compression by the reference generator 61 will be described in detail.

When N references R are given as replicas of a transmission pulse, the frequency offset unit 21 of the reference generator 61 applies offsets to the N references in accordance with the carrier frequencies $f_n^{(RF)}$ output from the MIMO radar controller 1 and thereby obtains a plurality of references having different frequencies.

When the frequency offset unit 21 obtains the N references, the reference synthesizing unit 81 of the reference generator 61 synthesizes the N references and outputs the synthesized reference to the frequency spectrum calculator 82.

When receiving the synthesized reference from the reference synthesizing unit 81, the frequency spectrum calculator 82 of the reference generator 61 calculates a frequency spectrum of the reference and outputs the frequency spectrum of the reference to the window function multipliers 83-1 to 83-N.

When receiving the frequency spectrum of the reference from the frequency spectrum calculator 82, the window function multiplier **83-*n* (n=1, . . . , N) multiplies, out of spectral components of a plurality of sub-bands in the frequency spectrum, a spectral component of the sub-band #n by the window function vector $w_{win}^{(n)}$ for reduction of range side lobes in the sub-band #n, and outputs the spectral component multiplied by the window function to the spectrum product calculator 62-*n*** as a reference for pulse compression in the sub-band #n expressed in expression (38).

Here, the window function vector $w_{win}^{(n)}$ for reduction of range side lobes in the sub-band #n will be described.

The synthesized reference output from the reference synthesizing unit 81 is a combination of the N references, and the frequency spectra of the N references are apart from each other by an offset applied by the frequency offset unit 21 on a frequency axis.

In the window function multiplier **83-*n*** (n=1, . . . , N), a window function vector $w_n^{(sub)}$ for a sub-band spectrum #n as well as a window function vector $w^{(full)}$ for the entire frequencies occupied by the synthesized reference are set as the window function vector $w_{win}^{(n)}$ for reduction of range side lobes in the sub-band #n.

The following mathematical formula (40) expresses the relationship among the window function vector $w_{win}^{(n)}$ for reduction of range side lobes and the window function vector $w_n^{(sub)}$ and the window function vector $w^{(full)}$.

$$w_{in}^{(n)}=w_n^{(sub)}\odot w^{(full)} \tag{40}$$

As a result, cross-correlated range side lobes are mitigated by the window function for the sub-bands, thereby enabling achievement of pulse compression with low range side lobe characteristics.

The sub-band window function multiplier 91 of the window function multiplier **83-*n* (n=1, . . . , N) multiplies the spectral component in the sub-band #n, out of the spectral components of the plurality of sub-bands in the frequency spectrum calculated by the frequency spectrum calculator 82**, by a window function corresponding to the sub-band #n.

That is, the sub-band window function multiplier 91 multiplies a sub-band spectrum #n (n=1, . . . , N) by a window function vector $w_n^{(sub)}$ of the sub-band spectrum #n.

If N=4, for example, a sub-band spectrum #2 is multiplied by a window function vector $w_2^{(sub)}$. As a result, the sub-band spectrum #2 is multiplied by the window function vector $w_2^{(sub)}$, and sub-band spectra #1, #3, and #4 have values approximately equal to zero.

The full-band window function multiplier 92 of the window function multiplier **83-*n* (n=1, . . . , N) multiplies the entire output signal of the sub-band window function multiplier 91** by the window function.

That is, the full-band window function multiplier 92 multiplies the entire the sub-band spectra #1 to #N by the window function vector $w^{(full)}$.

When receiving the frequency spectrum $x'_m{}^{(h)}$ of the received signal $x_m[l, h]$ from the Fourier transform unit 11 and receiving the reference for pulse compression in the sub-band #n expressed in expression (38) from the reference generator 61, the spectrum product calculator **62-*n* (n=1, . . . , N) of the pulse compression unit 9-*m*** (m=1, . . . , M) calculates a spectrum product $x_{n,m}^{(\theta b,h)}$ of the frequency spectrum $x'_m{}^{(h)}$ and the reference for pulse compression in the sub-band #n.

Ignoring the noise $n_m'$ included in the frequency spectrum $x'_m{}^{(h)}$ for the sake of simplifying the explanation, the spectrum product $x_{n,m}^{(\theta b,h)}$ is given by the following expression (41).

$$x_{n,m}^{(\theta_b,h)} = a_n^{(TX)}a_m^{(RX)}\exp\left(-j\frac{4\pi R_0}{c}(f_0^{(RF)}-f_d)\right)\exp(j2\pi f_d h' T_{PRI})\mathrm{diag}(w_{win}^{(n)})D_n(f_d)a(R_0) \tag{41}$$

When receiving the spectrum product $x_{n,m}^{(\theta b,h)}$ expressed in expression (41) from the spectrum product calculator **62-*n*, the inverse Fourier transform unit 63-*n* (n=1, . . . , N) of the pulse compression unit 9-*m* (m=1, . . . , M) performs inverse Fourier transform on the spectrum product $x_{n,m}^{(\theta b,h)}$ and outputs the result of the inverse Fourier transform to the received-beam outputting unit 64**.

In the second embodiment, it is assumed that the following approximation (42) holds with respect to the Doppler frequency $f_d$ like in the first embodiment.

$$f_d \approx 0 \tag{42}$$

Here, the spectrum product $x_{n,m}^{(\theta b,h)}$ expressed in expression (41) is given by the following expression (43).

$$x_{n,m}^{(\theta_b,h)} = a_n^{(TX)}a_m^{(RX)}\exp\left(-j\frac{4\pi R_0}{c}f_0^{(RF)}\right)\mathrm{diag}(W_{win}^{(n)})a(R_0) \tag{43}$$

In expression (43), the phase of $a(R_0)$ shows a linear change with respect to a frequency sample direction $f_1$ corresponding to the distance $R_0$, and the phase of the spectrum product $x_{n,m}^{(\theta b,h)}$ also linearly changes in a similar manner. It is therefore understood that the transmission beam synthesis accompanied with the window function $w_{win}^{(n)}$ and pulse compression are simultaneously performed by the inverse Fourier transform.

A compression output $y_{n,m}^{(\theta b)}$ (R) of a sub-band pulse for a desired distance R can be derived from multiplication of the spectrum product $x_{n,m}^{(\theta b,h)}$ by the weight vector $w_{PC}(R)$.

Therefore, the compression output $y_{n,m}^{(\theta b)}(R)$ of a sub-band pulse is given by the following expression (44).

$$\begin{aligned} y_{n,m}^{(\theta_b)}(R) &= w_{PC}(R)^H\ x_{n,m}^{(\theta_b,h)} \\ &= a_n^{(TX)} a_m^{(RX)} \exp\left(-j\frac{4\pi R_0}{c} f_0^{(RF)}\right) a(R)^H\ \mathrm{diag}(w_{win}^{(n)}) a(R_0) \end{aligned} \tag{44}$$

At the time of implementation, the calculation of expression (44) is performed for each range bin using inverse Fourier transform. The calculation result of expression (44) obtained for each range bin is an output signal of the inverse Fourier transform unit 63-*n*.

Here, $y_m^{(\theta b)}(R)$ obtained by conversion of the compression output $y_{n,m}^{(\theta b)}(R)$ of N sub-band pulses into a vector is defined as in the following expression (45).

$$\begin{aligned} y_m^{(\theta_b)}(R) &= \left[y_{1,m}^{(\theta_b)}(R)\ \dots\ y_{N,m}^{(\theta_b)}(R)\right]^T \\ &= a_m^{(RX)} \exp\left(-j\frac{4\pi R_0}{c} f_0^{(RF)}\right) a^{(TXb)} \odot \\ &\quad \begin{bmatrix} a(R)^H \mathrm{diag}(w_{win}^{(1)}) a(R_0) \\ \vdots \\ a(R)^H \mathrm{diag}(w_{win}^{(N)}) a(R_0) \end{bmatrix} \end{aligned} \tag{45}$$

In expression (45), a transmission steering vector $a^{(TXb)}$ is given by the following expression (46).

$$a^{(TXb)} = [a_1^{(TXb)} \dots a_N^{(TXb)}]^T \tag{46}$$

As expressed in the following expression (47), the received-beam outputting unit 64 of the pulse compression unit 9-*m* (m=1, . . . , M) sets a range-dependent transmission beam weight $w^{(TXb)}(R)$ which is determined by the beam directional angle $\theta_b$ and other information output from the MIMO radar exciter 2.

$$w^{(TXb)}(R) = C(R) a^{(TXb)} \tag{47}$$

In expression (47), C(R) is a matrix dependent on the distance to a target, which is given from the MIMO radar control 1 in a fixed or adaptive manner.

The received-beam outputting unit 64 performs complex synthesis while multiplying the vectorized $y_m^{(\theta b)}(R)$ expressed in expression (45) by the range-dependent transmission beam weight $w^{(TXb)}(R)$ expressed in expression (47), thereby calculating a received beam $z_m^{(\theta b)}(R)$ to be output to the received-beam synthesizing unit 10. The received beams $z_m^{(\theta b)}(R)$ output from the received-beam outputting unit 64 of the pulse compression units 9-*m* (m=1, . . . , M) to the received-beam synthesizing unit 10 are expressed by the following expression (48).

$$\begin{aligned} z_m^{(\theta_b)}(R) &= (w^{(TXb)}(R))^H y_m^{(\theta_b)}(R) \\ &= a_m^{(RX)} \exp\left(-j\frac{4\pi R_0}{c} f_0^{(RF)}\right) a^{(TXb)} C^H(R) \\ &\quad \left( a^{(TX)} \odot \begin{bmatrix} a(R)^H \mathrm{diag}(w_{win}^{(1)}) a(R_0) \\ \vdots \\ a(R)^H \mathrm{diag}(w_{win}^{(N)}) a(R_0) \end{bmatrix} \right) \end{aligned} \tag{48}$$

In expression (48), since $a^{(Txb)}$ and $a^{(TX)}$ are linearly coupled, it is obvious that transmission beams are synthesized. Moreover, since C (R) is included in expression (48), the expression (48) represents range-dependent transmission beam synthesis.

When receiving the received beams $z_m^{(\theta b)}(R)$ from the received-beam outputting unit 64 of the pulse compression units 9-1 to 9-M, the received-beam synthesizing unit 10 synthesizes the M received beams $z_m^{(\theta b)}(R)$ in accordance with beam directional angles $\theta_b$ output from the MIMO radar controller 1 as expressed in the following expression (49) and outputs an MIMO beam which is a synthesized signal $Z^{(\theta b)}(R)$ of the received beams to the outside.

$$\begin{aligned} Z^{(\theta_b)}(R) &= \sum_{m=1}^{M} (a_m^{(RX)})^* a_m^{(RX)} \exp \\ &\quad \left(-j\frac{4\pi R_0}{c} f_0^{(RF)}\right) a^{(TXb)} C^H(R) \left( a^{(TX)} \odot \begin{bmatrix} a(R)^H \mathrm{diag}(w_{win}^{(1)}) a(R_0) \\ \vdots \\ a(R)^H \mathrm{diag}(w_{win}^{(N)}) a(R_0) \end{bmatrix} \right) \end{aligned} \tag{49}$$

As is apparent from the above, according to the second embodiment, the pulse compression unit 9-*m* (m=1, . . . , M) perform inverse Fourier transform on spectrum products by obtaining frequency spectra of received signals by performing Fourier transform on the received signals output from receiver devices 7-*m* and calculating the spectrum products of references for pulse compression, the references determined by beam directional angles indicating propagation directions of transmission pulses and carrier frequencies, and the frequency spectra, and thus there is an effect of enabling reduction in the calculation scale by reducing the number of times of execution of Fourier transform and inverse Fourier transform when pulse compression is performed.

That is, the received-beam synthesizing unit 10 can generate the MIMO beam even though in the pulse compression unit 9-*m* Fourier transform is performed only once and inverse Fourier transform is performed only N times, and thus the calculation scale can be reduced.

Third Embodiment

In the second embodiment, the reference generator 61 includes the frequency offset unit 21, the reference synthesizing unit 81, the frequency spectrum calculator 82, and the window function multipliers 83-1 to 83-N. In a third embodiment, as illustrated in FIG. 12, a reference generator 61 may include a frequency offset unit 21, frequency spectrum calculators 101-1 to 101-N, and window function multipliers 102-1 to 102-N.

Figure 12:
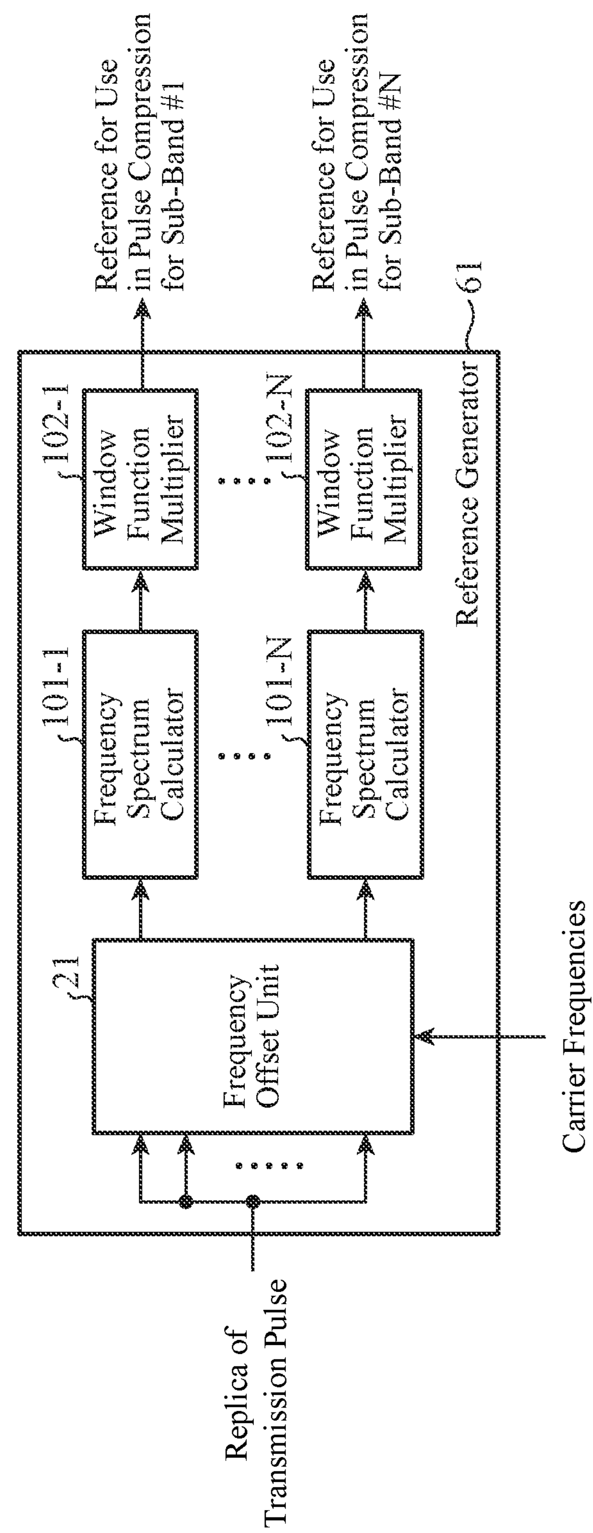
FIG. 12 is a configuration diagram illustrating a reference generator 61 in a radar apparatus according to a third embodiment of the invention.

FIG. 12 is a configuration diagram illustrating a reference generator 61 in a radar apparatus according to the third embodiment of the invention. In FIG. 12, the same symbol as that in FIGS. 6 and 10 represents the same or a corresponding part and thus descriptions thereon are omitted.

A frequency spectrum calculator 101-$n$ (n=1, . . . , N) N) performs processing of calculating a frequency spectrum of one reference by performing Fourier transform on the reference out of N references obtained from a frequency offset unit 21.

Out of spectral components of a plurality of sub-bands in the frequency spectrum calculated by the frequency spectrum calculator 101-$n$, a window function multiplier 102-$n$ (n=1, . . . , N) performs processing of multiplying a spectral component of a sub-band #n by a window function and outputting the spectral component multiplied by the window function to the spectrum product calculator 62-$n$ (n=1, . . . , N) as a reference for pulse compression in the sub-band #n.

Figure 13:
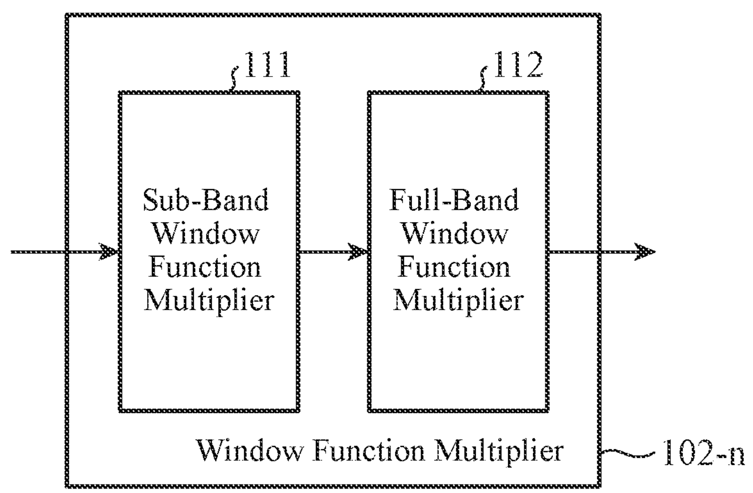
FIG. 13 is a configuration diagram illustrating window function multipliers 102-*n* (n=1, . . . , N) in the radar apparatus according to the third embodiment of the invention.

FIG. 13 is a configuration diagram illustrating a window function multiplier 102-$n$ (n=1, . . . , N) in the radar apparatus according to the third embodiment of the invention.

In FIG. 13, a sub-band window function multiplier 111 is a first window function multiplier that multiplies the spectral component in the sub-band #n, out of the spectral components of the plurality of sub-bands in the frequency spectrum calculated by the frequency spectrum calculator 101-$n$ (n=1, . . . , N), by a window function corresponding to the sub-band #n.

A full-band window function multiplier 112 is a second window function multiplier that multiplies an output signal of the sub-band window function multiplier 111 by a window function corresponding to the entire frequency spectrum calculated by the frequency spectrum calculator 101-$n$.

In the example of FIG. 13, the sub-band window function multiplier 111 is provided preceding to the full-band window function multiplier 112. Alternatively, the sub-band window function multiplier 111 may be provided subsequent to the full-band window function multiplier 112.

Next, the operation will be described.

Since the operation is similar to that of the second embodiment except for that of the reference generator 61, the contents of processing of the reference generator 61 will be described here.

When N references R are given as replicas of a transmission pulse, like in the second embodiment, the frequency offset unit 21 of the reference generator 61 applies offsets to the N references in accordance with the carrier frequencies $f_n^{(RF)}$ output from the MIMO radar controller 1 and thereby obtains a plurality of references having different frequencies.

When the frequency offset unit 21 obtains the N references, the frequency spectrum calculator 101-$n$ (n=1, . . . , N) of the reference generator 61 calculates a frequency spectrum of one reference by performing Fourier transform on the reference out of the N references.

That is, the frequency spectrum calculators 101-1 to 101-N perform Fourier transform on the references to which different offsets are applied, thereby calculating frequency spectra of the references.

When the window function multiplier 102-$n$ calculates the frequency spectrum of the reference, the window function multiplier 102-$n$ (n=1, . . . , N) of the reference generator 61 multiplies, out of spectral components of a plurality of sub-bands in the frequency spectrum, a spectral component of the sub-band #n by the window function vector $w_{win}^{(n)}$ for reduction of range side lobes in the sub-band #n, and outputs the spectral component multiplied by the window function to the spectrum product calculator 62-$n$ as a reference for pulse compression in the sub-band #n expressed in expression (38).

More specifically, the sub-band window function multiplier 111 of the window function multiplier 102-$n$ (n=1, . . . , N) multiplies the spectral component in the sub-band #n, out of the spectral components of the plurality of sub-bands in the frequency spectrum calculated by the frequency spectrum calculator 101-$n$ (n=1, . . . , N), by a window function corresponding to the sub-band #n.

That is, the sub-band window function multiplier 111 multiplies a sub-band spectrum #n (n=1, . . . , N) by a window function vector $w_n^{(sub)}$ of the sub-band spectrum #n.

If N=4, for example, a sub-band spectrum #2 is multiplied by a window function vector $w_2^{(sub)}$. As a result, the sub-band spectrum #2 is multiplied by the window function vector $w_2^{(sub)}$, and sub-band spectra #1, #3, and #4 have values approximately equal to zero.

The full-band window function multiplier 112 of the window function multiplier 102-$n$ (n=1, . . . , N) multiplies the entire output signal of the sub-band window function multiplier 111 by the window function.

That is, the full-band window function multiplier 112 multiplies the entire the sub-band spectra #1 to IN by the window function vector $w^{(full)}$.

As a result, like in the second embodiment, the effect of reduction in the calculation scale can be achieved also in the third embodiment by reducing the number of times of execution of Fourier transform and inverse Fourier transform when pulse compression is performed.

In the third embodiment, it is unnecessary to combine N references as in the second embodiment, and thus the configuration can be simplified as compared with that of the second embodiment.

Fourth Embodiment

In the first to third embodiments, a digital received signal $x_m[l,h]$ is output from the receiver device 7-$m$ (m=1, . . . , M) to the pulse compression unit 9-$m$. In the fourth embodiment, an example in which a pulse Doppler filter and a plurality of Doppler compensators are provided between receiver devices 7-$m$ (m=1, . . . , M) and s pulse compression unit 9-$m$ will be explained.

Figure 14:
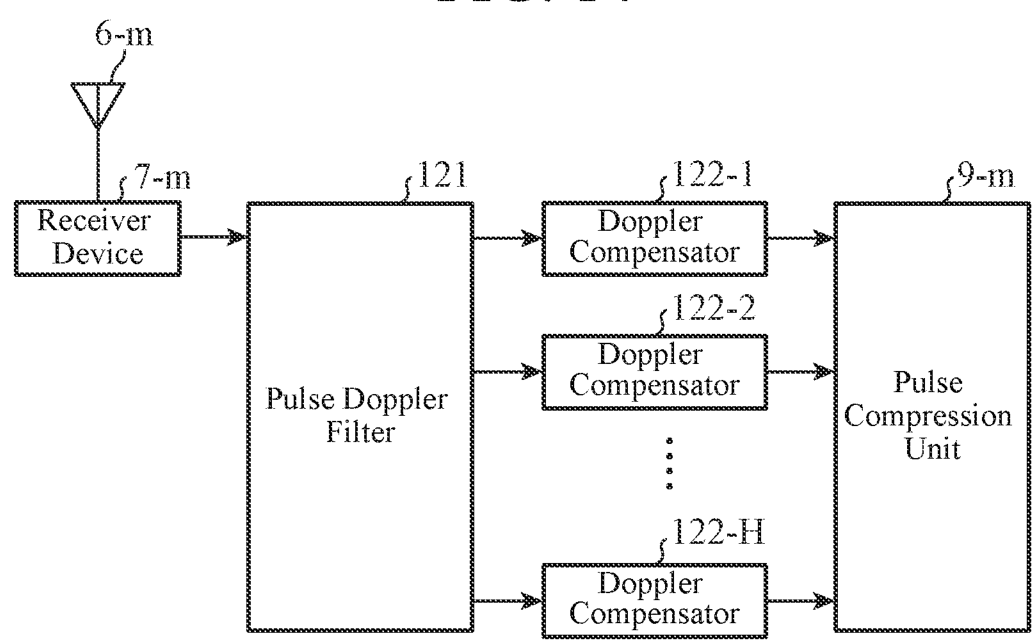
FIG. 14 is a configuration diagram illustrating a part of a radar apparatus according to a fourth embodiment of the invention.

FIG. 14 is a configuration diagram illustrating a part of a radar apparatus according to the fourth embodiment of the invention. In FIG. 14, the same symbol as that in FIG. 1 represents the same or a corresponding part and thus descriptions thereon are omitted.

The pulse Doppler filter 121 is implemented by, for example, a filter circuit that performs discrete Fourier transform, and performs processing of sampling, a plurality of times, a received signal $x_m[l,h]$ output from receiver devices 7-$m$ (m=1, . . . , M) for every pulse repetition interval PRI of transmission pulses emitted from transmission antennas 5-1 to 5-N and thereby obtaining a Doppler spectrum of the received signal $x_m[l,h]$.

The Doppler compensator 122-$h$ (h=1, . . . , H) includes, for example, a semiconductor integrated circuit on which a CPU is mounted or a one chip microcomputer, and performs processing of performing Doppler compensation of the received signal $x_m[l,h]$ on the basis of a Doppler spectral component #h out of Doppler spectral components #1 to #H that are H analytical Doppler frequencies in the Doppler spectrum obtained by the pulse Doppler filter 121 and outputting the received signal after the Doppler compensation to the pulse compression unit 9-$m$ (m=1, . . . , M).

Note that the pulse Doppler filter 121 and the Doppler compensators 122-1 to 122-H provided between the receiver devices 7-*m* (m=1, . . . , M) and the pulse compression unit 9-*m* may be mounted inside a signal processor 8 or provided outside the signal processor 8.

Next, the operation will be described.

Since the operation is similar to that of the first to third embodiments except for that of the pulse Doppler filter 121 and the Doppler compensators 122-1 to 122-H, the contents of processing of the pulse Doppler filter 121 and the Doppler compensators 122-1 to 122-H will be described here.

In the first to third embodiments, it is assumed that approximations (33) hold with respect to the Doppler frequency $f_d$ and the target azimuth $\theta_0$. In the case where approximations (33) are not satisfied, the phase characteristic of the steering vector $a(R_0)$ related to the distance $R_0$ includes phase jump, and thus even though transmission beams are synthesized as in the first to third embodiments, range side lobe characteristics are deteriorated.

In the fourth embodiment, a countermeasure especially against the case where approximations (33) are not satisfied with respect to the Doppler frequency $f_d$ is disclosed.

First, a flow of the processing will be briefly explained.

Since a target Doppler frequency $f_d$ is generally unknown, the pulse Doppler filter 121 is provided preceding the pulse compression unit 9-*m* (m=1, . . . , M), and the pulse Doppler filter 121 obtains a Doppler spectrum of a received signal $x_m[l,h]$ output from a receiver device 7-*m*. That is, the received signal $x_m[l,h]$ output from the receiver device 7-*m* is divided into Doppler spectral components #h (h=1, . . . , H) which are H analytical Doppler frequencies.

In the Doppler compensator 122-*h* (h=1, . . . , H), Doppler compensation is performed on the received signal $x_m[l,h]$ on the basis of a Doppler spectral component #h out of Doppler spectral components #1 to #H that are H analytical Doppler frequencies, and the received signal after the Doppler compensation is output to the pulse compression unit 9-*m* (m=1, . . . , M).

Hereinafter, the contents of processing of the pulse Doppler filter 121 and the Doppler compensators 122-1 to 122-H will be specifically described.

The received signal $x_m[l,h]$ before pulse compression is expressed by the above expression (16), and if receiver noise $n_m[l, h]$ is neglected for simplicity of explanation, the received signal $x_m[l,h]$ before pulse compression is given by the following expression (50) using the above expression (11).

$$\begin{aligned} x_m[l,h] &= \sum_{n=1}^{N} S_{n,m}[l,h] \\ &= a_m^{(RX)} r\left(l'\Delta t - \frac{2R_0}{c}\right) \sum_{n=1}^{N}\left(a_n^{(TX)}\exp\left(-j\frac{4\pi R_0}{c}f_n^{(RF)}\right)\exp\right. \\ &\quad \left.(j2\pi(\Delta f_n + f_d)l'\Delta t)\exp(j2\pi(\Delta f_n + f_d)h'T_{PRI})\right) \end{aligned} \tag{50}$$

In expression (50), $\exp(j2\pi(\Delta f_n+f_d)h'T_{PRI})$ represents a Doppler frequency component observed at a sampling interval $T_{PRI}$ in a hit direction.

A reciprocal number of $T_{PRI}$ is a pulse repetition frequency $f_{PRI}$, and in the radar apparatus, since $f_d>f_{PRI}$ holds, the situation where the Doppler frequency $f_d$ is folded may occur.

Denoting the Doppler frequency $f_d$ that is folded by $f_d^{(fold)}$, the Doppler frequency $f_d$ is expressed by the following expression (51). Where, i is an integer and represents the number of times of folding.

$$f_d = l\cdot f_{PRP} + f_d^{(fold)} \tag{5}$$

Since this folding occurs in a similar manner for N frequency offset values $\Delta f_n$ (n=1, . . . , N), a frequency offset value $\Delta f_n$ is expressed by the following expression (52). Where, $j_n$ is an integer and represents the number of times of folding.

$$\Delta f_n = j_a \cdot f_{PRF} + \Delta f_a^{(fold)} \tag{52}$$

Substituting expressions (51) and (52) into $\exp(j2\pi(\Delta f_n+f_d)h'T_{PRI})$, the received signal $x_m[l,h]$ expressed in the expression (50) is given by the following expression (53).

$$x_m[l,h] = a_m^{(RX)} r\left(l'\Delta t - \frac{2R_0}{c}\right) \sum_{n=1}^{N}\left(a_n^{(TX)}\exp\left(-j\frac{4\pi R_0}{c}f_n^{(RF)}\right)\right. \\ \left.\exp(j2\pi(\Delta f_n + f_d)l'\Delta t)\exp\left(j2\pi\left(\Delta f_n^{(fold)} + f_d^{(fold)}\right)h'T_{PRI}\right)\right) \tag{53}$$

Next, in the l-th range bin, the received signal $x_m[l,h]$ in the hit direction including H samples is input to the pulse Doppler filter 121, and a Doppler spectrum $y_m^{(l)}$ obtained by the pulse Doppler filter 121 is expressed by the following expression (54).

$$y_m^{(l)} = a_m^{(RX)} r\left(l'\Delta t - \frac{2R_0}{c}\right) \sum_{n=1}^{N}\left(a_n^{(TX)}\exp\left(-j\frac{4\pi R_0}{c}f_n^{(RF)}\right)\right. \\ \left.\exp(j2\pi(\Delta f_n + f_d)l'\Delta t) q_n^{\left(f_d^{(fdd)}\right)}\right) \tag{54}$$

In expression (54), $q_n^{(fd(fdd))}$ represents a component that changes in the hit direction in expression (54), that is, a Doppler spectrum obtained by inputting $\exp(j2\pi(\Delta f_n^{(fdd)}+f_d^{(fdd)})h'T_{PRI})$ into the pulse Doppler filter 121.

Furthermore, the center frequency of H filters included in the pulse Doppler filter 121, that is, an analytical Doppler frequency $f_h$ is expressed by the following expression (55).

$$f_h = \frac{h-1}{H} f_{PRF} - \frac{1}{2} f_{PRF} \tag{55}$$

Let $f_{h0}$ be an analytical Doppler frequency closest to a target Doppler frequency $f_d^{(fold)}$ that is folded.

Hereinafter, $h_0$ represents an analytical Doppler bin including the target signal and is referred to as a target Doppler bin. Assuming that $f_{PRI}/H$ gives a Doppler resolution, relationships expressed by the following inequalities (56) hold.

$$f_{h_0} - \frac{1}{2}\frac{f_{PRF}}{H} \le f_d^{(fold)} < f_{h_o} + \frac{1}{2}\frac{f_{PRF}}{H} \\ \Updownarrow \\ -\frac{1}{2}\frac{f_{PRF}}{H} \le f_d^{(fold)} - f_{h_0} < \frac{1}{2}\frac{f_{PRF}}{H} \tag{56}$$

Therefore, a Doppler spectrum $[y_m^{(l)}]_{h0}$ of the target Doppler bin $h_0$ is expressed by the following expression (57).

$$[y_m^{(l)}]_{h_0} = a_m^{(RX)} r\left(l'\Delta t - \frac{2R_0}{c}\right) \sum_{n=1}^{N} \left(a_n^{(TX)} \exp\left(-j\frac{4\pi R_0}{c} f_n^{(RF)}\right) \exp(j2\pi(\Delta f_n + f_d) l'\Delta t) \left[q_n^{(f_d^{(fdd)})}\right]_{h_0}\right) \tag{57}$$

In order to perform Doppler compensation on a data series of a time length, in which L target Doppler spectra $[y_m^{(l)}]h_0$ expressed by expression (57) are aligned, that is, a data series of $T_{PRI}$ in the Doppler compensators 122-1 to 122-H, a Doppler compensation parameter $c^{(h0)}(l)$ as expressed in the following expression (58) is given to the Doppler compensators 122-1 to 122-H.

$$c^{(h0)}(l) = \exp(-j2\pi f_{h_0} l'\Delta t) \tag{58}$$

In a Doppler compensator 122-*h* (h=1, . . . , H), the Doppler spectrum parameter $[y_m^{(l)}]h_0$ is multiplied by the Doppler compensation parameter $c^{(h0)}(l)$, thereby the Doppler frequency component $\exp(j2\pi f_d l'\Delta t)$ in the Doppler spectrum $[y_m^{(l)}]h_0$ in the range direction is compensated.

$$\begin{aligned} c^{(h_0)}(l)\cdot[y_m^{(l)}]_{h_0} &= a_m^{(RX)} r\left(l'\Delta t - \frac{2R_0}{c}\right) \sum_{n=1}^{N} \left(a_n^{(TX)} \exp\left(-j\frac{4\pi R_0}{c} f_n^{(RF)}\right) \exp(j2\pi(\Delta f_n + f_d - f_{h_0}) l'\Delta t) \left[q_n^{(f_d^{(fdd)})}\right]_{h_0}\right) \\ &= a_m^{(RX)} r\left(l'\Delta t - \frac{2R_0}{c}\right) \sum_{n=1}^{N} \left(a_n^{(TX)} \exp\left(-j\frac{4\pi R_0}{c} f_n^{(RF)}\right) \exp(j2\pi(\Delta f_n + \Delta f_d) l'\Delta t) \left[q_n^{(f_d^{(fdd)})}\right]_{h_0}\right) \end{aligned} \tag{59}$$

Note that $\Delta f_d$ is herein referred to as a compensated Doppler frequency $\Delta f_d$ as expressed in the following expression (60).

$$\begin{aligned} \Delta f_d &= f_d - f_{h_0} \\ &= i \cdot f_{PRF} + f_d^{(fold)} - f_{h_0} \end{aligned} \tag{60}$$

The compensated Doppler frequency $\Delta f_d$ in the case of no folding where i=0 is given by $f_d^{(fold)} - f_{h0}$, which is smaller than the Doppler resolution $f_{PRI}/H$.

In a situation where the compensated Doppler frequency $\Delta f_d$ is less than the Doppler resolution $f_{PRI}/H$ and is sufficiently small, it is regarded that the Doppler compensation has been performed.

On the other hand, the compensated Doppler frequency $\Delta f_d$ in the case where folding occurs where i≠0, $f_d^{(fold)} - f_{h0}$ is sufficiently small. In this regard, a Doppler frequency component $i \cdot f_{PRI}$ which cannot be fully compensated still remains.

Therefore, there are cases where sufficient compensating effects cannot be expected even though Doppler compensation is performed. Thus, it is desirable that the Doppler compensation of the fourth embodiment is applied to a radar apparatus in which no folding occurs or a radar apparatus in which folding rarely occurs.

The above expression (59) represents a data series of a time length in which the Doppler frequency component $\exp(j2\pi f_d l'\Delta t)$ included in the Doppler spectrum $[y_m^{(l)}]_{h0}$ of the target Doppler bin $h_0$ expressed in the expression (57) is compensated, that is, a data series of $T_{PRI}$.

Hereafter, pulse compression is performed while $c^{(h0)}(l) \cdot [y^{(l)}]_{h0}$ given by expression (59) is regarded as the received signal $x_m[l,h]$ expressed in expression (16).

That is, $c^{(h0)}(l) \cdot [y_m^{(l)}]_{h0}$ given by expression (59) is output from the Doppler compensator 122-*h* (h=1, . . . , H) to the pulse compression unit 9-*m* as the received signal $x_m[l,h]$ expressed in expression (16).

As a result, in the case where the pulse compression unit 9-*m* performs, for example, similar processing to that of the first embodiment, a synthesized output $z_m^{(\theta b)}(R)$ of transmission beams after Doppler compensation that corresponds to the synthesized output $z_m^{(\theta b)}(R)$ of transmission beams expressed in expression (36) is obtained.

Note that since the target Doppler frequency $f_d$ is unknown in fact, the above Doppler compensation is performed on outputs $c^{(h)}(l) \cdot [y_m^{(l)}]_h$ of all analytical Doppler bins.

As is apparent from the above, according to the fourth embodiment, the pulse Doppler filter 121 for sampling, a plurality of times, the received signal $x_m[l,h]$ output from the receiver devices 7-1 to 7-M for every pulse repetition interval PRI of transmission pulses emitted from the transmission antennas 5-1 to 5-N and thereby obtaining a Doppler spectrum of the received signal $x_m[l,h]$ and the Doppler compensators 122-*h* (h=1, . . . , H) for performing Doppler compensation on the received signal $x_m[l,h]$ on the basis of a Doppler spectral component #h out of the Doppler spectral components #1 to #H that are H analytical Doppler frequencies obtained by the pulse Doppler filter 121 and outputting the received signal after the Doppler compensation to the pulse compression units 9-*m* (m=1, . . . , M) are included. Therefore, in addition to similar effects to those of the first to third embodiments, deterioration of range side lobes due to the Doppler frequencies can be avoided.

In the first to fourth embodiments described above, pulses on which complex linear frequency modulation is performed are assumed as the transmission pulses having the carrier frequencies $f_n^{(RF)}$ (n=1, . . . , N) emitted from the transmission antennas 5-1 to 5-N of the pulse emitter 3. Alternatively, non-linear frequency modulation may be performed on the pulses.

Note that, within the scope of the present invention, the present invention may include a flexible combination of the respective embodiments, a modification of any component of the respective embodiments, or an omission of any component in the respective embodiments.

INDUSTRIAL APPLICABILITY

The invention is suitable for a radar apparatus that performs MIMO beam synthesis in which received signals of respective reflected waves are synthesized while being subjected to pulse compression using transmission pulses.

REFERENCE SIGNS LIST

1: MIMO radar controller; 2: MIMO radar exciter; 3: pulse emitter; 4: MIMO radar transmitter; 4-1 to 4-N: transmitter devices; 5-1 to 5-N: Transmission antennas; 6-1 to 6-M: Reception antennas (antennas); 7: MIMO radar receiver; 7-1 to 7-M: Receiver devices; 8: Signal processor; 9-1 to 9-M: Pulse compression units, 10: Received-beam synthesizing unit; 11: Fourier transform unit; 12: Reference generator; 13: Spectrum product calculator; 14: Inverse Fourier transform unit; 21: Frequency offset unit; 22: Weight multiplier; 23: Reference synthesizing unit; 24: Frequency spectrum calculator; 25: Window function multiplier; 31: Respective sub-band window function multiplier (first window function multiplier); 32: Full-band window function multiplier (second window function multiplier); 41: Fourier transform circuit; 42: Reference generating circuit; 43: Spectrum product calculating circuit; 44: Inverse Fourier transform circuit; 51: Memory; 52: Processor; 61: Reference generator; 62-1 to 62-N: Spectrum product calculators; 63-1 to 63-N: Inverse Fourier transform units; 64: Received-beam outputting unit; 71: Reference generating circuit; 72: Spectrum product calculating circuit; 73: Inverse Fourier transform circuit; 74: Received-beam outputting circuit; 81: Reference synthesizing unit; 82: Frequency spectrum calculator; 83-1 to 83-N: Window function multipliers; 91: Sub-band window function multiplier (first window function multiplier); 92: Full-band window function multiplier (second window function multiplier); 101-1 to 101-N: Frequency spectrum calculators; 102-1 to 102-N: Window function multipliers; 111: Sub-band window function multiplier (first window function multiplier); 112: Full-band window function multiplier (second window function multiplier); 121: Pulse Doppler filter; and 122-1 to 122-H: Doppler compensators.

The invention claimed is:

1. A radar apparatus, comprising:

a pulse emitter configured to emit a plurality of transmission pulses having different carrier frequencies to space;

a plurality of antennas configured to receive reflected waves of the transmission pulses that have been emitted from the pulse emitter and thereafter reflected by a target present in the space;

a plurality of receivers configured to output received signals indicating the reflected waves received by the plurality of antennas;

a Fourier transform circuit configured to perform Fourier transforms on the received signals output from the plurality of receivers to calculate a frequency spectrum of the received signals;

a reference generating circuit configured to generate references for pulse compression which is determined on a basis of the carrier frequencies and a beam direction angle indicating propagation directions of the transmission pulses;

a spectrum product calculating circuit configured to calculate spectrum products between the frequency spectra of the received signal and the references for pulse compressions; and an inverse Fourier transform circuit configured to perform inverse Fourier transforms on the spectrum products calculated by the spectrum product calculating circuit, and synthesize received beams that are the spectrum products subjected to the inverse Fourier transforms, in accordance with the beam directional angle, wherein the reference generating circuit includes a frequency offset circuit configured to obtain a plurality of references having different frequencies by applying offsets to a replica of a transmission pulse in accordance with the carrier frequencies, respectively;

a weight multiplier configured to multiply the references obtained by the frequency offset circuit by weights corresponding to the beam directional angle;

a reference synthesizing circuit configured to synthesize the references multiplied by the weights by the weight multiplier;

a frequency spectrum calculator configured to calculate a frequency spectrum of a reference obtained by the synthesis in the reference synthesizing circuit; and a window function multiplier configured to multiply the frequency spectrum calculated by the frequency spectrum calculator by a window function, and output the frequency spectrum multiplied by the window function, to the spectrum product calculator, as the reference for a pulse compression, and wherein the window function multiplier includes:

a first window function multiplier configured to multiply each of sub-bands of the frequency spectrum calculated by the frequency spectrum calculator, by a window function corresponding to each of the sub-bands; and a second window function multiplier configured to multiply the frequency spectrum calculated by the frequency spectrum calculator, by a window function corresponding to the entire frequency spectrum.

2. The radar apparatus according to claim 1, further comprising:

a pulse Doppler filter configured to sample, multiple times, received signals output from the receiver devices for every pulse repetition interval of the transmission pulses emitted from the pulse emitter, and calculate Doppler spectra of the received signals; and a plurality of Doppler compensators configured to perform Doppler compensations on the received signals on a basis of a Doppler spectral component among Doppler spectral components of the Doppler spectrum obtained by the pulse Doppler filter, and output the received signals subjected to the Doppler compensations to the circuitry.

3. The radar apparatus according to claim 1, wherein the pulse emitter emits pulses on which complex linear frequency modulation is performed, as the plurality of transmission pulses having different carrier frequencies.

4. The radar apparatus according to claim 1, wherein the pulse emitter emits pulses on which non-linear frequency modulation is performed, as the plurality of transmission pulses having different carrier frequencies.

5. A radar apparatus, comprising:

a pulse emitter configured to emit a plurality of transmission pulses having different carrier frequencies to space;

a plurality of antennas configured to receive reflected waves of the transmission pulses that have been emitted from the pulse emitter and thereafter reflected by a target present in the space;

a plurality of receivers configured to output received signals indicating the reflected waves received by the plurality of antennas;

a Fourier transform circuit configured to perform a Fourier transform on a received signal output from the receiver device thereby to calculate a frequency spectrum of the received signal;

a reference generator configured to generate references for pulse compressions which are determined on a basis of the carrier frequencies for respective sub-bands in the frequency spectrum of the received signal;

a plurality of spectrum product calculators, each spectrum product calculator being configured to calculate a spectrum product between a spectral component of one sub-band among spectral components of sub-bands in the frequency spectrum obtained by the Fourier transform circuit, and a reference of the one sub-band generated by the reference generator;

a plurality of inverse Fourier transform circuits configured to perform inverse Fourier transforms on spectrum products calculated by the spectrum product calculators; and a received-beam outputting circuit configured to synthesize results of the inverse Fourier transforms performed by the plurality of inverse Fourier transform circuits, in accordance with the beam directional angle, and output a result obtained by synthesizing the results of the inverse Fourier transforms, as the received beam, wherein the reference generator includes:

a frequency offset circuit configured to obtain a plurality of references having different frequencies by applying offsets to a replica of a transmission pulse in accordance with the carrier frequencies, respectively;

a reference synthesizing circuit configured to synthesize the plurality of references obtained by the frequency offset circuit;

a frequency spectrum calculator configured to calculate a frequency spectrum of a reference obtained by the synthesis in the reference synthesizing circuit; and a plurality of window function multipliers, each window function multiplier being configured to multiply a spectral component of one sub-band among spectral components of sub-bands in the frequency spectrum calculated by the frequency spectrum calculator, by a window function, and output a frequency spectrum multiplied by the window function, as a reference of the one sub-band, and wherein the window function multiplier includes:

a first window function multiplier configured to multiply a spectral component of one sub-band among spectral components of sub-bands in the frequency spectrum calculated by the frequency spectrum calculator, by a window function corresponding to the one sub-band; and a second window function multiplier configured to multiply the frequency spectrum calculated by the frequency spectrum calculator, by a window function corresponding to an entire band of the frequency spectrum.

6. The radar apparatus according to claim 5, herein the reference generator includes:

a frequency offset circuit configured to obtain a plurality of references having different frequencies by applying offsets to a replica of a transmission pulse in accordance with the carrier frequencies, respectively;

a plurality of frequency spectrum calculators configured to calculate a frequency spectrum of one reference of the references obtained by the frequency offset circuit; and a plurality of window function multipliers, each window function multiplier being configured to multiply a spectral component of one sub-band among spectral components of sub-bands in the frequency spectrum calculated by the frequency spectrum calculator, by a window function, and output a frequency spectrum multiplied by the window function, as a reference of the one sub-band.

7. The radar apparatus according to claim 6, wherein the window function multiplier includes:

a first window function multiplier configured to multiply a spectral component of one sub-band among spectral components of sub-bands in the frequency spectrum calculated by the frequency spectrum calculator, by a window function corresponding to the one sub-band; and a second window function multiplier configured to multiply the frequency spectrum calculated by the frequency spectrum calculator, by a window function corresponding to an entire band of the frequency spectrum.

* * * * *